(12) United States Patent
Mann et al.

(10) Patent No.: US 11,392,556 B1
(45) Date of Patent: Jul. 19, 2022

(54) DIGITAL PROCESSING SYSTEMS AND METHODS FOR DRAFT AND TIME SLIDER FOR PRESENTATIONS IN COLLABORATIVE WORK SYSTEMS

(71) Applicant: MONDAY.COM LTD., Tel Aviv (IL)

(72) Inventors: Roy Mann, Tel Aviv (IL); Ron Zionpour, Kfar Sirkin (IL); Tal Haramati, Tel Aviv (IL)

(73) Assignee: Monday.com Ltd., Tel Aviv (IL)

( * ) Notice: Subject to any disclaimer, the term of this patent is extended or adjusted under 35 U.S.C. 154(b) by 0 days.

(21) Appl. No.: 17/565,821

(22) Filed: Dec. 30, 2021

Related U.S. Application Data

(63) Continuation of application No. PCT/IB2021/062440, filed on Dec. 29, 2021, and a
(Continued)

(51) Int. Cl.
*G06F 16/18* (2019.01)
*G06F 16/176* (2019.01)
(Continued)

(52) U.S. Cl.
CPC ........ *G06F 16/1873* (2019.01); *G06F 3/0486* (2013.01); *G06F 3/04847* (2013.01); *G06F 16/176* (2019.01)

(58) Field of Classification Search
CPC . G06F 16/1873; G06F 16/176; G06F 3/04847
See application file for complete search history.

(56) References Cited

U.S. PATENT DOCUMENTS 5,479,602 A 12/1995 Baecker et al.
5,517,663 A 5/1996 Kahn
(Continued)

FOREIGN PATENT DOCUMENTS

CN 107422666 A 12/2017
CN 107623596 A 1/2018
(Continued)

OTHER PUBLICATIONS

U.S. Appl. No. 17/143,897, filed Jan. 7, 2021.
(Continued)

*Primary Examiner* — Loc Tran
(74) *Attorney, Agent, or Firm* — Finnegan, Henderson, Farabow, Garrett & Dunner LLP

(57) ABSTRACT

Systems, methods, and computer-readable media for tracking on a slide-by-slide basis, edits to presentation slides are disclosed. The systems and methods may involve accessing a stored deck of presentation slides; populating a first window, a second window, and a third window with slides of the deck; receiving a selection of a particular slide having a current version displayed in the second window and a former version displayed in the third window; receiving a first selection of the particular slide in the second window; upon receipt of the first selection, causing a rendition of the particular slide to appear in the first window; receiving a second selection of the particular slide in the third window; and upon receipt of the second selection, causing a rendition of the particular slide to appear in the first window.

10 Claims, 20 Drawing Sheets

Related U.S. Application Data continuation-in-part of application No. PCT/IB2021/000297, filed on Apr. 28, 2021, and a continuation-in-part of application No. PCT/IB2021/000090, filed on Feb. 11, 2021, and a continuation-in-part of application No. PCT/IB2021/000024, filed on Jan. 14, 2021.

(60) Provisional application No. 63/273,448, filed on Oct. 29, 2021, provisional application No. 63/273,453, filed on Oct. 29, 2021, provisional application No. 63/233,925, filed on Aug. 17, 2021.

(51) Int. Cl.
*G06F 3/0486* (2013.01)
*G06F 3/04847* (2022.01)

(56) References Cited

U.S. PATENT DOCUMENTS

| | | |
|---|---|---|
| 5,682,469 A | 10/1997 | Linnett |
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,553 A | 1/2000 | Schneider et al. |
| 6,023,695 A | 2/2000 | Osborn et al. |
| 6,167,405 A | 12/2000 | Rosensteel, Jr. et al. |
| 6,169,534 B1 | 1/2001 | Raffel et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,522,347 B1 | 2/2003 | Tsuji et al. |
| 6,527,556 B1 | 3/2003 | Koskinen |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 7,027,997 B1 | 4/2006 | Robinson et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,379,934 B1 | 5/2008 | Forman et al. |
| 7,383,320 B1 | 6/2008 | Silberstein et al. |
| 7,415,664 B2 | 8/2008 | Aureglia et al. |
| 7,461,077 B1 | 12/2008 | Greenwood |
| 7,489,976 B2 | 2/2009 | Adra |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,916,157 B1 | 3/2011 | Kelley et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,423,909 B2 | 4/2013 | Zabielski |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,129,234 B2 | 9/2015 | Campbell et al. |
| 9,172,738 B1 | 10/2015 | daCosta |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,760,271 B2 | 9/2017 | Persaud |
| 9,798,829 B1 | 10/2017 | Baisley |
| 9,866,561 B2 | 1/2018 | Psenka et al. |
| 9,870,136 B2 | 1/2018 | Pourshahid |
| 10,043,296 B2 | 8/2018 | Li |
| 10,067,928 B1 | 9/2018 | Krappe |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,445,702 B1 | 10/2019 | Hunt |
| 10,452,360 B1 | 10/2019 | Burman et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,564,622 B1 | 2/2020 | Dean et al. |
| 10,573,407 B2 | 2/2020 | Ginsburg |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |

(56) References Cited

U.S. PATENT DOCUMENTS

| | | |
|---|---|---|
| D910,077 S | 2/2021 | Naroshevitch et al. |
| 10,963,578 B2 | 3/2021 | More et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 2001/0008998 A1 | 7/2001 | Tamaki et al. |
| 2001/0032248 A1 | 10/2001 | Krafchin |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0135558 A1 | 7/2003 | Bellotti et al. |
| 2003/0187864 A1 | 10/2003 | McGoveran |
| 2003/0200215 A1 | 10/2003 | Chen et al. |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0172592 A1 | 9/2004 | Collie et al. |
| 2004/0212615 A1 | 10/2004 | Uthe |
| 2004/0215443 A1 | 10/2004 | Hatton |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0015806 A1 | 1/2006 | Wallace |
| 2006/0031148 A1 | 2/2006 | O'Dell et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0173908 A1 | 8/2006 | Browning et al. |
| 2006/0190313 A1 | 8/2006 | Lu |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0250369 A1 | 11/2006 | Keim |
| 2006/0253205 A1 | 11/2006 | Gardiner |
| 2006/0287998 A1 | 12/2006 | Folting et al. |
| 2006/0294451 A1 | 12/2006 | Kelkar et al. |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1* | 2/2008 | Cisler ................. G06F 9/451 |
| | | 715/764 |
| 2008/0034314 A1 | 2/2008 | Louch et al. |
| 2008/0065460 A1 | 3/2008 | Raynor |
| 2008/0077530 A1 | 3/2008 | Banas et al. |
| 2008/0104091 A1 | 5/2008 | Chin |
| 2008/0126389 A1 | 5/2008 | Mush et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0195948 A1 | 8/2008 | Bauer |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0198715 A1 | 8/2009 | Barbarek |
| 2009/0248710 A1 | 10/2009 | McCormack et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095219 A1* | 4/2010 | Stachowiak ........ G06F 16/9562 |
| | | 715/745 |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287221 A1 | 11/2010 | Battepati et al. |
| 2010/0324964 A1 | 12/2010 | Callanan et al. |

(56) References Cited

U.S. PATENT DOCUMENTS

| | | |
|---|---|---|
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0219321 A1 | 9/2011 | Gonzalez et al. |
| 2011/0225525 A1 | 9/2011 | Chasman et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0079408 A1 | 3/2012 | Rohwer |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1 | 2/2013 | Chazin et al. |
| 2013/0086460 A1 | 4/2013 | Folting et al. |
| 2013/0090969 A1 | 4/2013 | Rivere |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |
| 2013/0238968 A1 | 9/2013 | Barrus |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2014/0006326 A1 | 1/2014 | Bazanov |
| 2014/0019842 A1 | 1/2014 | Montagna et al. |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0108985 A1 | 4/2014 | Scott et al. |
| 2014/0109012 A1 | 4/2014 | Choudhary et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137144 A1 | 5/2014 | Järvenpää et al. |
| 2014/0173401 A1 | 6/2014 | Oshlag et al. |
| 2014/0188748 A1 | 7/2014 | Cavoue et al. |
| 2014/0195933 A1 | 7/2014 | Rao |
| 2014/0214404 A1 | 7/2014 | Kalia et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142829 A1 | 5/2015 | Lee et al. |
| 2015/0153943 A1 | 6/2015 | Wang |
| 2015/0169531 A1 | 6/2015 | Campbell et al. |
| 2015/0212717 A1 | 7/2015 | Nair et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0281292 A1 | 10/2015 | Murayama |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0246490 A1 | 8/2016 | Cabral |
| 2016/0253982 A1 | 9/2016 | Cheung et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0335302 A1 | 11/2016 | Teodorescu |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0350950 A1 | 12/2016 | Ritchie et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |

(56) References Cited

U.S. PATENT DOCUMENTS

| | | |
|---|---|---|
| 2017/0061342 A1 | 3/2017 | LoRe et al. |
| 2017/0061360 A1 | 3/2017 | Rucker et al. |
| 2017/0063722 A1 | 3/2017 | Cropper et al. |
| 2017/0075557 A1 | 3/2017 | Noble et al. |
| 2017/0091337 A1 | 3/2017 | Patterson |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0126772 A1 | 5/2017 | Campbell et al. |
| 2017/0132296 A1 | 5/2017 | Ding |
| 2017/0139874 A1 | 5/2017 | Chin |
| 2017/0139884 A1 | 5/2017 | Bendig et al. |
| 2017/0153771 A1 | 6/2017 | Chu |
| 2017/0177888 A1 | 6/2017 | Arora et al. |
| 2017/0185668 A1 | 6/2017 | Convertino et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel |
| 2017/0236081 A1 | 8/2017 | Grady Smith et al. |
| 2017/0242921 A1 | 8/2017 | Rota |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0351252 A1 | 12/2017 | Kleifges et al. |
| 2017/0372442 A1 | 12/2017 | Mejias |
| 2018/0025084 A1 | 1/2018 | Conlan et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088989 A1 | 3/2018 | Nield et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0357305 A1 | 12/2018 | Kinast et al. |
| 2018/0373434 A1 | 12/2018 | Switzer et al. |
| 2018/0373757 A1 | 12/2018 | Schukovets et al. |
| 2019/0005094 A1 | 1/2019 | Yi |
| 2019/0036989 A1 | 1/2019 | Eirinberg et al. |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1 | 8/2019 | McKenna |
| 2019/0251884 A1 | 8/2019 | Burns et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0026397 A1 | 1/2020 | Wohlstadter et al. |
| 2020/0042648 A1 | 2/2020 | Rao |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0247661 A1 | 8/2020 | Rao et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0348809 A1 | 11/2020 | Drescher |
| 2020/0349320 A1 | 11/2020 | Owens |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0084120 A1 | 3/2021 | Fisher et al. |
| 2021/0124872 A1 | 4/2021 | Lereya |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0264220 A1 | 8/2021 | Wei et al. |

FOREIGN PATENT DOCUMENTS

| | | |
|---|---|---|
| CN | 107885656 A | 4/2018 |
| CN | 112929172 A | 6/2021 |
| WO | WO 2004/100015 A2 | 11/2004 |
| WO | WO 2006/116580 A2 | 11/2006 |
| WO | WO 2017/202159 A1 | 11/2017 |
| WO | WO 2020/187408 A1 | 9/2020 |

OTHER PUBLICATIONS

U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.

(56) References Cited

OTHER PUBLICATIONS

U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,725, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
U.S. Appl. No. 17/565,652, filed Dec. 30, 2021.
U.S. Appl. No. 17/565,699, filed Dec. 30, 2021.
U.S. Appl. No. 17/565,853, filed Dec. 30, 2021.
U.S. Appl. No. 17/565,880, filed Dec. 30, 2021.
U.S. Appl. No. 17/564,745, filed Dec. 29, 2021.
U.S. Appl. No. 17/565,526, filed Dec. 30, 2021.
U.S. Appl. No. 17/565,614, filed Dec. 30, 2021.
U.S. Appl. No. 17/565,718, filed Dec. 30, 2021.
U.S. Appl. No. 17/565,843, filed Dec. 30, 2021.
U.S. Appl. No. 17/565,534, filed Dec. 30, 2021.
U.S. Appl. No. 17/565,801, filed Dec. 30, 2021.
U.S. Appl. No. 17/565,780, filed Dec. 30, 2021.
Alessio et al., Monday.com Walkthrough 2018\All Features, Platforms & Thoughts, Mar. 1, 2018, pp. 1-55, 2018.
Rodrigo et al., Project Management with Monday.com: a 101 Introduction; Jul. 22, 2019, pp. 1-21, 2019.
International Search Report and Written Opinion of the International Searching Authority in PCT/IB2020/000658, dated Nov. 11, 2020 (12 pages).
International Search Report in PCT/IB2020/000974, dated May 3, 2021 (19 pages).
International Search Report in PCT/IB2021/000090 dated Jul. 27, 2021.
ShowMyPC, "Switch Presenter While Using ShowMyPC"; web archive.org; Aug. 20, 2016.
International Search Report and Written Opinion of the International Search Authority in PCT/IB2020/000024, dated May 3, 2021 (13 pages).
"Pivot table—Wikipedia"; URL: https://en.wikepedia .org/w/index.php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2020, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).
International Search Report and Written Opinion of the International Search Authority in PCT/IB2021/000297, dated Oct. 12, 2021 (20 pages).
Dapulse.com "features".extracted from web.archive.or/web/2014091818421/https://dapulse.com/features; Sep. 2014 (Year: 2014).
Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).
Isaiah Pinchas etal., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

* cited by examiner 800   1100

Study 1 - Create a new item

This is our new time slider and we are so excited to share it with our users.

Tasks

Before we begin, can you briefly tell us about your company and job role?
This is a board that was created for your team to use. Review it and then move on to the next task.
Think of an actual task you have to take care of at work today, tell us about it.
Who in your company is involved with this task? What information would you need to complete this task?
Launch design/prototype url
Let's say you wanted to create this task you just described to us within an application and assign it to someone on your team. You click the button "New item" and receive this screen.
Explain how you would add all the information for the task you describe. [Verbal Response]
Go through each tab being shown to you. Explain what each section provides. What kind of task info would you add here? (Description, Updates, Activity Log)
Let's say, for this task to get done, you need to provide an image/design. Within this page, tell us where you would add this.

FIG. 11

DIGITAL PROCESSING SYSTEMS AND METHODS FOR DRAFT AND TIME SLIDER FOR PRESENTATIONS IN COLLABORATIVE WORK SYSTEMS

CROSS-REFERENCE TO RELATED APPLICATIONS

This application is based on and claims benefit of priority of International Patent Application No. PCT/IB2021/062440 filed on Dec. 29, 2021, which claims priority to U.S. Provisional Patent Application No. 63/233,925, filed Aug. 17, 2021, U.S. Provisional Patent Application No. 63/273,448, filed Oct. 29, 2021, U.S. Provisional Patent Application No. 63/273,453, filed Oct. 29, 2021, International Patent Application No. PCT/IB2021/000024, filed on Jan. 14, 2021, International Patent Application No. PCT/IB2021/000090, filed on Feb. 11, 2021, and International Patent Application No. PCT/IB2021/000297, filed on Apr. 28, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

One aspect of the present disclosure may be directed to systems, methods, and computer readable media for tracking on a slide-by-slide basis, edits to presentation slides. Systems, methods, devices, and non-transitory computer readable mediums may include at least one processor that is configured to: present a first window defining a slide pane for displaying a slide subject to editing; present in a second window a current graphical slide sequence pane, for graphically displaying a current sequence of slides in the deck; present in a third window an historical graphical slide sequence pane for graphically presenting a former sequence of slides in the deck; access a stored deck of presentation slides; populate the first window, the second window, and the third window with slides of the deck; receive a selection of a particular slide having a current version displayed in the second window and a former version displayed in the third window; receiving a first selection of the particular slide in the second window; upon receipt of the first selection, cause a rendition of the particular slide to appear in the first window; receive a second selection of the particular slide in the third window; and upon receipt of the second selection, cause a rendition of the particular slide to appear in the first window.

BRIEF DESCRIPTION OF THE DRAWINGS

FIG. 11 illustrates an example of a rolled-back display reflecting edits made to a specific portion of an electronic document, consistent with some embodiments of the present disclosure.

DETAILED DESCRIPTION

Figure 1:
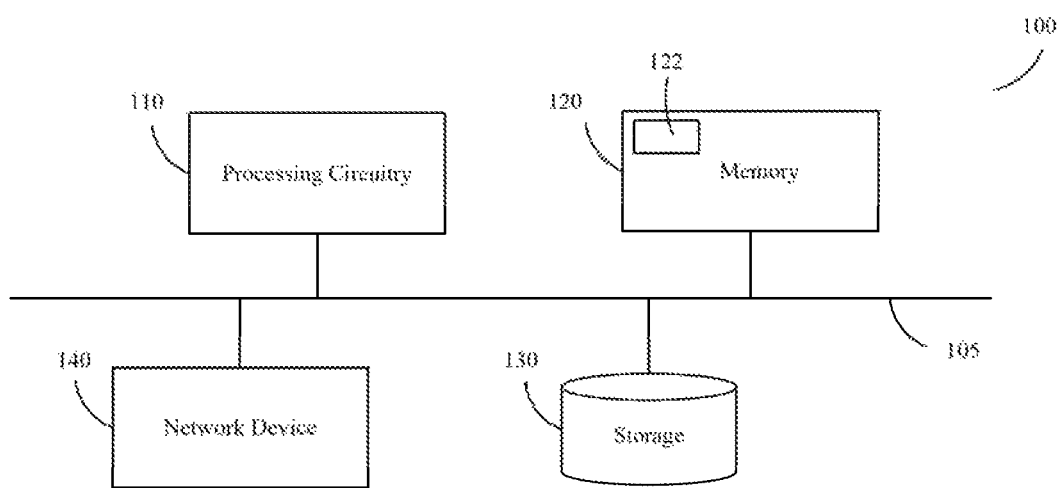
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an." and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed, such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration.

An electronic collaborative word processing document may be stored in one or more repositories connected to a network accessible by one or more users through their computing devices. In one embodiment, one or more users may simultaneously edit an electronic collaborative word processing document. The one or more users may access the electronic collaborative word processing document through one or more user devices connected to a network. User access to an electronic collaborative word processing document may be managed through permission settings set by an author of the electronic collaborative word processing document. An electronic collaborative word processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
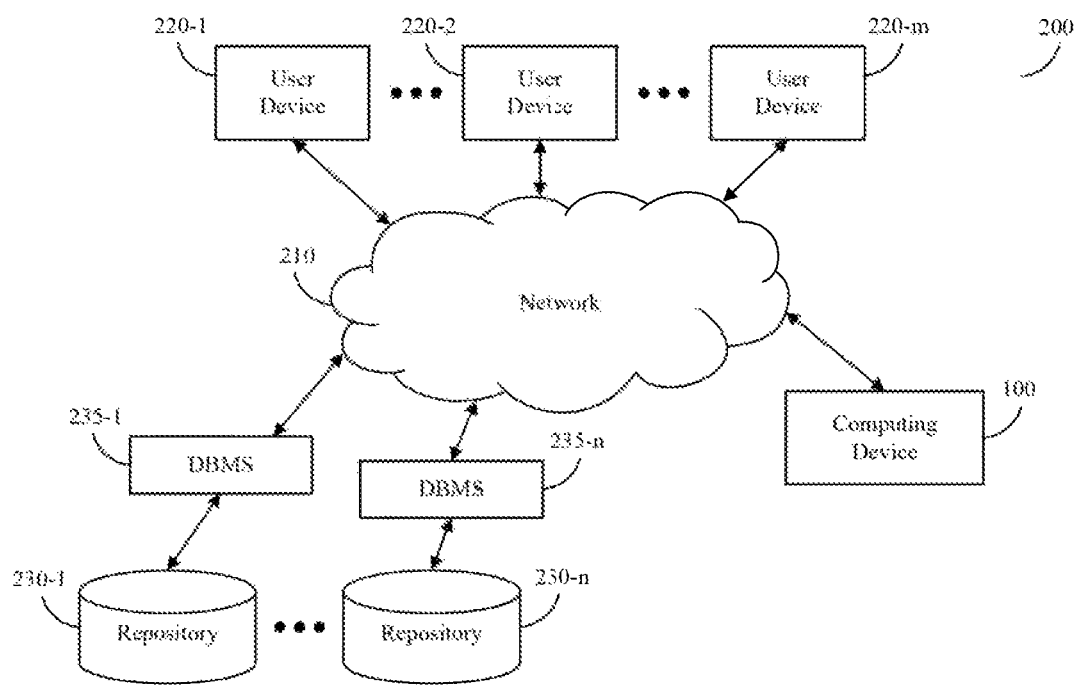
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100, Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Figure 3:
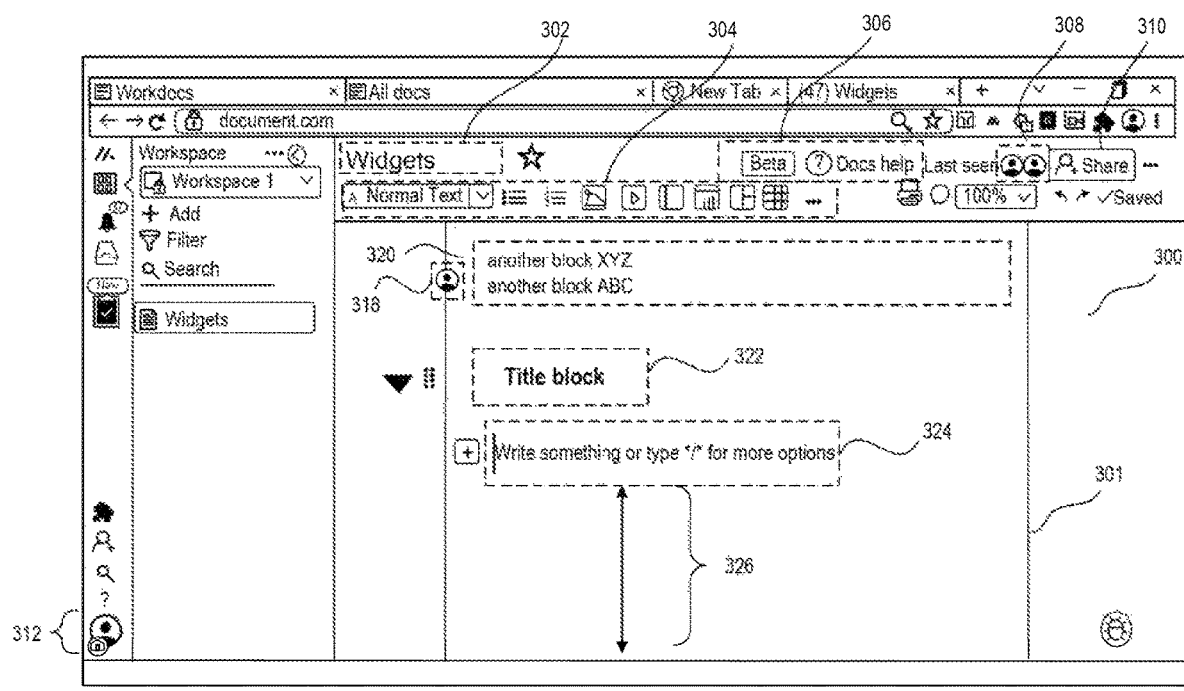
FIG. 3 illustrates an example of an electronic collaborative word processing document, consistent with some embodiments of the present disclosure.

FIG. 3 is an exemplary embodiment of a presentation of an electronic collaborative word processing document 301 via an editing interface or editor 300. The editor 300 may include any user interface components 302 through 312 to assist with input or modification of information in an electronic collaborative word processing document 301, For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

Various embodiments of this disclosure describe unconventional systems, methods, and computer-readable media for enabling simultaneous group editing of electronically stored documents. While multiple users may simultaneously edit electronically stored documents, it may be difficult to distinguish which group or groups the edits correspond to. It may be difficult to define groups and limit which users are able to edit another user's previous edits, it may be beneficial to separate the multiple users into separate defined groups. Edits made by a first group may need to be identified and distinguished from edits made by a second group. Further it may be beneficial to automatically identify new users as belonging to the first group, second group, or a new third group based on characteristics of the new users. It may be beneficial to require permission before members become part of a group and make edits on behalf of the group. Furthermore, it may be beneficial to decide when alterations made by one group may be viewed by the other group. By enabling groups of editors collaborating on an electronic document, a system may increase its processing efficiency by sorting users into determined, different groups so that users belonging to certain groups may be identified together and streamline the system's tracking process for edits from numerous computing devices associated with different user accounts.

Some disclosed embodiments may involve systems, methods, and computer-readable media for enabling simultaneous group editing of electronically stored documents. A group may refer to one or more members associated with an aggregate where each member may include any entity such as a person, client, group, account, device, system, network, business, corporation, or any other user accessing a collaborative electronic document through an associated computing device or account. An electronically stored document, as used herein, may include a file containing any information that is stored in electronic format, such as text files, word processing documents, Portable Document Format (pdf), spreadsheets, sound clips, audio files, movies, video files, tables, databases, or any other digital file. Editing may include adding, deleting, rearranging, modifying, correcting, or otherwise changing the data or information in an electronically stored document. Group editing may be simultaneous in that multiple users may edit an electronically stored document in real time or near real time. Group editing may also occur at different times. For example, a first group (e.g., company A) may have employees and a second group (e.g., company B) may have their own employees, and both the first group and the second group may have their respective employees accessing and editing an electronic collaborative word processing document stored in a cloud-based repository, discussed in further detail below.

Some disclosed embodiments may include accessing a collaborative electronic document. Accessing may refer to gaining authorization or entry to download, upload, copy, extract, update, edit, or otherwise receive, retrieve, or manipulate data or information. For example, for a client device (e.g. a computer, laptop, smartphone, tablet, VR headset, smart watch, or any other electronic display device capable of receiving and sending data) to access a collaborative electronic document, the client device may send a request to retrieve information stored in a repository associated with a system, which may require authentication or credential information, and the system processor may confirm or deny authentication information supplied by the client device as needed. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication. A collaborative electronic document may be any processing document, including word processing, presentation slides, tables, databases, graphics, sound files, video files or any other digital document or file (e.g. a text, programming language, video, presentation, audio, image, design, document, spreadsheet, tabular, virtual machine, a link or shortcut, an image file, a video file, a video game file, an audio file, a playlist file, an audio editing file, a drawing file, a graphic file, a presentation file, a spreadsheet file, a project management file, a pdf file, a page description file, a compressed file, a computer-aided design file, a database, a publishing file, a font file, a financial file, a library, a web page, a personal information manager file, a scientific data file, a security file, a source code file, or any other type of file which may be stored in a database). Accessing a collaborative electronic document may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provide a medium for exchanging data.

For example, a collaborative electronic document may be stored in repository 230-1 as shown in FIG. 2. Repository 230-1 may be configured to stem software, files, or code, such as a collaborative electronic document developed using computing device 100 or user device 220-1. Repository 230-1 may further be accessed by computing device 100, user device 220-1, or other components of system 200 for downloading, receiving, processing, editing, or viewing, the collaborative electronic document. Repository 230-1 may be any suitable combination of data storage devices, which may optionally include any type or combination of slave databases, load balancers, dummy servers, firewalls, back-up databases, and/or any other desired database components. In some embodiments, repository 230-1 may be employed as a cloud service, such as a Software as a Service (SaaS) system, a Platform as a Service (PaaS), or Infrastructure as a Service (IaaS) system. For example, repository 230-1 may be based on infrastructure of services of Amazon Web Services™ (AWS), Microsoft Azure™, Google Cloud Platform™, Cisco Metapod™, Joyent™, vmWare™, or other cloud computing providers. Repository 230-1 may include other commercial file sharing services, such as Dropbox™, Google Docs™, or iCloud™. In some embodiments, repository 230-1 may be a remote storage location, such as a network drive or server in communication with network 210. In other embodiments repository 230-1 may also be a local storage device, such as local memory of one or more computing devices (e.g., computing device 100) in a distributed computing environment.

Some disclosed embodiments may include linking a first entity and a second entity to form a first collaborative group, and linking a third entity and a fourth entity to form a second collaborative group. The relational terms herein such as "first" and "second" are used only to differentiate an entity or operation from another entity or operation, and do not require or imply any actual relationship or sequence between these entities or operations. An entity may include a person, client, group, account, device, system, network, business, corporation, or any other user accessing a collaborative electronic document through an associated computing device or account, Linking a first entity and a second entity may include joining, connecting, associating, or otherwise establishing a relationship between the first and second entity. A collaborative group may refer to any combination of entities linked together to form an aggregate entity. The first entity and second entity may be linked to form a first collaborative group. The first entity and second entity may be manually or automatically linked. For example, the first entity and second entity may be manually assigned to a collaborative group by an administrator, supervisor, or any other user. For example, the user may input instructions into a computing device that associates two entities together to form a group. Automatic linking may include automatically assigning the first and second entities to a collaborative group based on one or more settings, conditions, instructions, or other factors including but not limited to the company they work for, a shared network drive, the domain associated with their email address, the team they are on, a predetermined or predefined list, randomly, or any other way of classifying entities. For example, the system may determine that the first user associated with a first email address (e.g., employee1@company1.com) and the second user associated with a second email address (e.g., employee2@company1.com) belong to a first collaborative group (e.g., Company1) because the email addresses include the same or similar email address domains. Once an entity is assigned to a collaborative group, the entity may also be unlinked from the collaborative group and may be further reassigned to another collaborative group.

Some disclosed embodiments may include linking a third entity and a fourth entity to form a second collaborative group. The definitions of accessing a collaborative electronic document, collaborative group, and linking, as described above in connection with the first collaborative group applies equally to the second collaborative group. However, the specific functionality associated with each collaborative group may vary. In one embodiment for example, the first collaborative group may be linked automatically while the second collaborative group may be linked manually.

In some embodiments a first collaborative group may include a plurality of first additional entities linked to first and second entities, and a second collaborative group may include a plurality of second additional entities linked to third and fourth entities. An additional entity may be any added, extra, or supplemental entity to the first and second entities as discussed previously above. For example, a first additional entity may be linked to the first collaborative group (e.g., already including the first and second entities) so there are three entities in the first collaborative group: the first entity, the second entity, and the first additional entity. One or more first additional entities may be linked to the first collaborative group. Similarly, for example, a second additional entity may be linked to the second collaborative group so there are three entities in the second collaborative group: the third entity, the fourth entity, and the second additional entities. One or more second additional entities may be linked to the second collaborative group. Additional entities may be included at the formation of the collaborative group or after the collaborative group was formed. As a non-limiting example, the first additional entity may be linked to the first and second entities at or near the same time as the formation of the first collaborative group. Alternatively, for example, the first additional entity may be linked to the first entity and second entity at a time after the formation of the first collaborative group. The plurality of first and second additional entities may be linked to the first and second collaborative groups consistent with linking steps previously discussed. Similarly, the first and second additional entities may be unlinked from the collaborative groups and reassigned to other collaborative groups as needed by manual or automatic steps. For example, if a first additional entity (e.g., employee3@company1.com) was linked to a first collaborative group, but then leaves the company, the system may detect that the email address no longer exists and remove the first additional entity from the first collaborative group. Additionally or alternatively, if the first additional entity (e.g., employee3@company1.com) was linked to a first collaborative group (e.g., Company1), but then changes companies to Company2, the system may detect the updated email address domain for the first additional entity and in response, link the first additional entity with the second collaborative group (e.g., Company2).

Some disclosed embodiments may include receiving a first alteration by a first entity to a collaborative electronic document, tagging the first alteration by the first entity with a first collaborative group indicator, receiving a second alteration to the collaborative electronic document by a second entity, and tagging the second alteration by the second entity with the first collaborative group indicator. An alteration may include any edit, addition, deletion, comment, change, subtraction, rearrangement, correction, or any other modification of the information in a collaborative electronic document. Receiving the alteration may include receiving an input from any computing device associated with an entity that provides instructions to at least one processor to manipulate data or other information contained in the collaborative electronic document. For example, receiving an alteration may include a computing device associated with a user manually inputting information or instructions, sending a signal associated with a change of information (e.g. a status change), or any other information that may be input, detected, or transmitted. Tagging the alteration may include identifying, marking, labeling, associating, classifying, or otherwise indicating the source of the first alteration through an identifier such as metadata that may be stored in a repository. For example, the system may receive an input from a computing device that adds metadata to an associated alteration to link and store the metadata with the alteration in a repository so that any collaborating entity may access the tagged information. A first collaborative group indicator may include any identification for the collaborative group, such as one or more colors, names, shapes, symbols, graphical indicators, images, pictures, alphanumeric characters, avatars, videos, VR or AR object, metadata, or any combination thereof. For example, the system may receive an edit to the collaborative electronic document made by a first employee of Company1, that results in a rendering of a collaborative group indicator, such as a logo of Company1, in the collaborative electronic document so any entity accessing the document can see the logo of Company1 associated with the edit. The system may receive a second edit to the collaborative electronic document by a different, second employee of Company1. The second edit may result in the rendering of a collaborative group indicator, such as the logo of Company1, that also appears in the collaborative electronic document so any entity accessing the document can see the logo of Company1 associated with the second edit. Further, the system may tag the alteration by the second entity with the first collaborative group indicator because the system may recognize that the second entity belongs to the first collaborative group, as discussed previously above. For example, the first and second employees at Company1 may make edits, and the system may determine they belong to the same first collaborative group (e.g., Company1). As a result, the system may display an indicator associated with edits made by both with the same color associated with Company1.

Some disclosed embodiments may include receiving a third alteration to a collaborative electronic document by a third entity, tagging the third alteration by the third entity with a second collaborative group indicator, receiving a fourth alteration from the fourth entity to the collaborative electronic document, and tagging the fourth alteration by the fourth entity with the second collaborative group indicator. As stated above, the relational terms herein such as "first," "second," "third," and so on are used only to differentiate an entity or operation from another entity or operation, and do not require or imply any actual relationship or sequence between these entities or operations. The definitions of an alteration, tagging, and a collaborative group indicator, as described above in connection with the first collaborative group indicator applies equally to the second collaborative group indicator. However, the specific functionality associated with each collaborative group may vary. The second collaborative group indicator may be different from the first collaborative group indicator. The second collaborative group indicator may distinguish the third and fourth alterations from the first and second alterations. For example, the second collaborative group indicator may be the color red, while the first collaborative group indicator may be the color blue. Additionally, or alternatively, the second collaborative group indicator may be the name of a company, while the first collaborative group indicator may be the name of a different company. This may reduce the processing time and storage requirements associated with a collaborative electronic document, since the system may only need to track and store information by collaborative groups after the system determines the collaborative group associations, rather than track and store information according to individual users.

Figure 4:
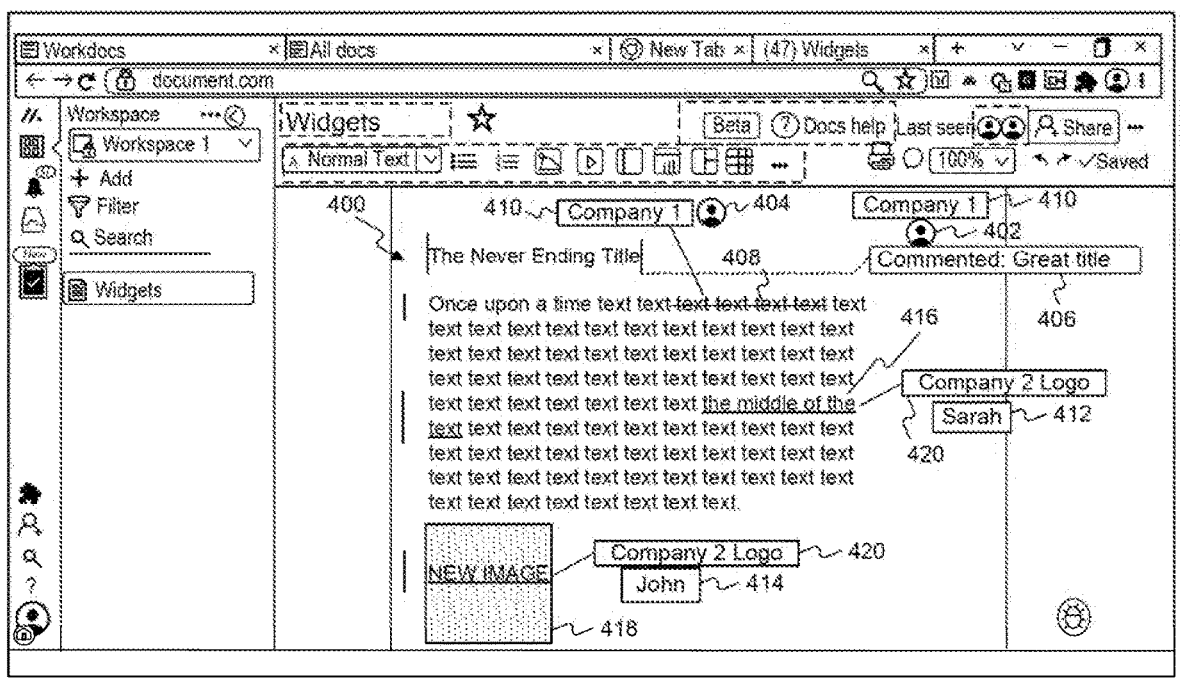
FIG. 4 illustrates an example of a collaborative electronic document, consistent with some embodiments of the present disclosure.

For example, as shown in FIG. 3, the collaborative electronic document may be an electronic collaborative word processing document 301 via an editing interface or editor 300. In FIG. 4, may illustrate another embodiment of a collaborative electronic document 400. A first entity 402 (identified by a thumbnail) and a second entity 404 (identified by a thumbnail) may be represented by a thumbnail or any other graphical or alphanumeric indicator in the collaborative electronic document. A third entity 412 (identified by an alphanumeric indicator) and a fourth entity 414 (identified by an alphanumeric indicator) may be represented by their name. The first entity 402 and the second entity 404 may be linked to form the first collaborative group, manually or automatically by the system as discussed above. The first collaborative group may be indicated by the first collaborative group indicator 410, the name "Company 1." The third entity 412 and the fourth entity 414 may be linked to form the second collaborative group, which may be indicated by the second collaborative group indicator 420, "Company 2 logo." The first entity 402 may make a comment, "Great title" on part of the collaborative electronic document, which may be the first alteration 406. The second entity 404 may make a deletion which may be the second alteration 408. Both the first alteration 406 and the second alteration 408 may be tagged by the system with the first collaborative group indicator 410 as a result of recognizing that the first alteration 406 and the second alteration 408 were made by entities belonging to the first collaborative group. The third entity 412 may add text, "the middle of the text" to part of the document, which may be the third alteration 416. The fourth entity 414 may add a "NEW IMAGE" to the document, which may be the fourth alteration 418. The third alteration 416 and the fourth alteration 418 may be tagged with the second collaborative group indicator 420 as a result of recognizing that the third alteration 416 and the fourth alteration 420 were made by entities belonging to the second collaborative group.

Aspects of this disclosure may prevent a second collaborative group from making edits to a first alteration and a second alteration. Preventing may refer to inhibiting, not allowing, disabling, blocking, or otherwise limiting any action. Making edits may refer to removing, deleting, cutting, adding to, correcting, rewriting, modifying, or making any other alteration. Preventing entities from the second collaborative group from making edits to alterations made by the first collaborative group, for example, may lock the display of information altered by the first collaborative group so that entities from the second collaborative group may only view the altered information. For example, if the first alteration made by the first entity of the first collaborative group adds an image to the collaborative electronic document, the third entity and fourth entity of the second collaborative group may not be allowed to change, delete, or interact with the image. In some embodiments, the system may also provide a notification to the entities of the second collaborative group that they may be restricted from making alterations. In other embodiments, the system may render the information altered by the first collaborative group in a different format or any other indication (e.g., text that is in gray font) to indicate to the second collaborative group that the system is preventing it from making edits to the altered information.

For example, in FIG. 4, the first entity 402 and the second entity 404 may not be able to delete the third alteration 416 ("the middle of the text") that was added by the third entity 412 (identified by the alphanumeric characters "Sarah"). Similarly, the first entity 402 and the second entity 404 may not be able to delete the fourth alteration 418 "NEW IMAGE."

Some disclosed embodiments may include a processor configured to receive an attempt by a fifth entity to change a first alteration, access permissions settings, determine whether the fifth entity possess a permission enabling change of the first alteration, and upon determination of a change-enabling permission, apply the change to the first alteration. Receiving an attempt by a fifth entity to change the first alteration may include the system receiving a signal from a computing device associated with the fifth entity that contains instructions for making an edit to the first alteration. A change may include any instructions to edit, remove, delete, add, correct, rewrite, rearrange, or otherwise modify information in the collaborative electronic document. Permission settings may include any configurations that can grant, allow, restrict, limit, check, verify or otherwise determine user access associated with a collaborative electronic document. Permission settings may be any permissions associated with a collaborative electronic document that may be defined by a user or predefined by the system. As discussed above, user access to an electronic collaborative word processing document may be managed through permission settings set by an author of the electronic collaborative word processing document. Accessing permission settings may include performing a lookup in a storage or repository containing permission configurations for authorized accounts that access a collaborative electronic document. A permission enabling change may include any approval, consent, agreement, assent, permit, or other authorization of an entity to make an alteration. Determining whether the fifth entity possess a permission may refer to verifying, regulating, or otherwise determining if the fifth entity has a change-enabling permission. This may involve performing a lookup in a repository of authorized entities to verify whether the accessing entity is listed in a list of pre-authorized entities for accessing information. Applying the change to the first alteration may include adopting the instructions to make the change and manipulation the information contained in the first alteration, as discussed above, and carrying out the instructions and storing the change in the repository. After carrying out these instructions, the system may be configured to then determine whether the fifth entity belongs to a previously recorded collaborative group or belongs to a new collaborative group, discussed in further detail below.

For example, a permission may be based on a predetermined condition or other requirement stored in a repository that may be determined based on a processor performing a lookup in the repository and determining that an entity accessing the collaborative electronic document meets a threshold and is authorized to access the information or functionality in the collaborative electronic document. Alternatively, permission may be determined, assigned, or otherwise designated by a user or any other entity associated with the collaborative electronic document. For example, permission or authorization to change may only be allowed by certain entities such as an administrator, manager, group, team, or other authorized individuals or entities. For example, the system may determine that the fifth entity does not possess change-enabling permission after the system performs a lookup of authorized entities in the stored permission settings. Alternatively, for example, it may be determined that the fifth entity does possess change-enabling permission. Some disclosed embodiments may require permission or approval from the first entity, the second entity, or both the first and the second entity in order for the fifth entity to possess change-enabling permission. This may ensure that all entities associated with the first collaborative group authorize each other's alterations before releasing the alterations to the other collaborative groups on the collaborative electronic document. Additionally or alternatively, it may be required that a different entity (i.e. administrator, manager, or other user) determine whether the fifth entity possess change-enabling permission. In some disclosed embodiments, for example, each attempt by a fifth entity to make a change to an alteration may require determining whether the fifth entity possess change-enabling permission. Alternatively, for example, whether the fifth entity possess change-enabling permission may only need to be determined once, which may then be recorded in the repository as a permission setting regarding the fifth entity for accessing the collaborative electronic document.

For example, in FIG. 2, a fifth entity may access a collaborative electronic document from user device 220-2 via Network 210 and stored in repository 230-1. After accessing the collaborative electronic document, the fifth entity may see alterations made on user device 220-1 by a first entity of a first collaborative group. The fifth entity may attempt to change the alterations made by the first entity. The computing device 100 may then determine, by looking up instructions stored in its memory whether the fifth entity (user device 220-2) has permission to change the first alteration. It may be determined that the fifth entity has permission to change, and the changes may then be stored in repository 230-1. The next entity that accesses the collaborative electronic document on user device 220-$m$, via Network 210, may see the changes made by the fifth entity to the collaborative electronic document.

In some aspects of the disclosure, it may be determined that a fifth entity possesses the permission, based on a determination that the fifth entity is associated with the first collaborative group. Determination that the fifth entity is associated with the first collaborative group may include analyzing characteristics of the fifth entity, comparing them to the characteristics of the first collaborative group, and identifying a similar or matching characteristic such that the fifth entity is related to the first collaborative group, consistent with the discussion above. For example, it may be required that the fifth entity be a part of the first collaborative group (i.e., linked to the first entity and the second entity) to possess a change-enabling permission. Alternatively, for example, it may be determined that the fifth entity may possess a change-enabling permission and may not be a part of the first collaborative group. Alternatively, some embodiments may include at least one processor further configured to recognize a fifth entity as a member of a third collaborative group with permission to change alterations of a first collaborative group, to permit the change to a first alteration, and to tag the change with a third collaborative group indicator. Recognizing the fifth entity as a member of a third collaborative group may include determining that the fifth entity may be linked to an additional collaborative group (e.g., the third collaborative group) or that it may not belong to either the first collaborative group or the second collaborative group. For example, the system may analyze characteristics of the fifth entity and recognize that it is associated with Company3, different from Company1 that is associated with a first collaborative group, and different from Company2 that is associated with a second collaborative group. The system may determine that the fifth entity is associated with a third collaborative group and that the third collaborative group has permission to change alterations made by the first collaborative group (Company1). The changes may be tagged or otherwise associated with a third collaborative group indicator (e.g. the logo of Company3). Recognizing that the third collaborative group with permission to change alterations of the first collaborative group may include determining that the third collaborative group is authorized to change the first alteration based on default or configured permission settings, consistent with the disclosure discussed previously above. For example, the third collaborative group may be permitted to change alterations of the first collaborative group but may not be permitted to change alterations of the second collaborative group. Alternatively, the third collaborative group may be permitted to change alterations of the first and second collaborative group. Consistent with the discussion above, permitting the change to the first alteration may refer to allowing or authorizing an entity to edit, add, delete, comment on, change, subtract, rearrange, correct or any other granting of authority to modify the first alteration. Tagging the change with a third collaborative group indicator may include identifying, marking, labeling, associating, classifying, or otherwise indicating the source of the change through an identifier (e.g., the third collaborative group indicator). For example, tagging a change may include associating metadata with the change that may be stored in a repository and not necessarily displayed. In other examples, tagging the change may include associating an indicator (e.g., graphical, alphanumeric, or a combination thereof) that may be presented in a manner to indicate additional information relating to or otherwise identifying the collaborative group.

Figure 5A:
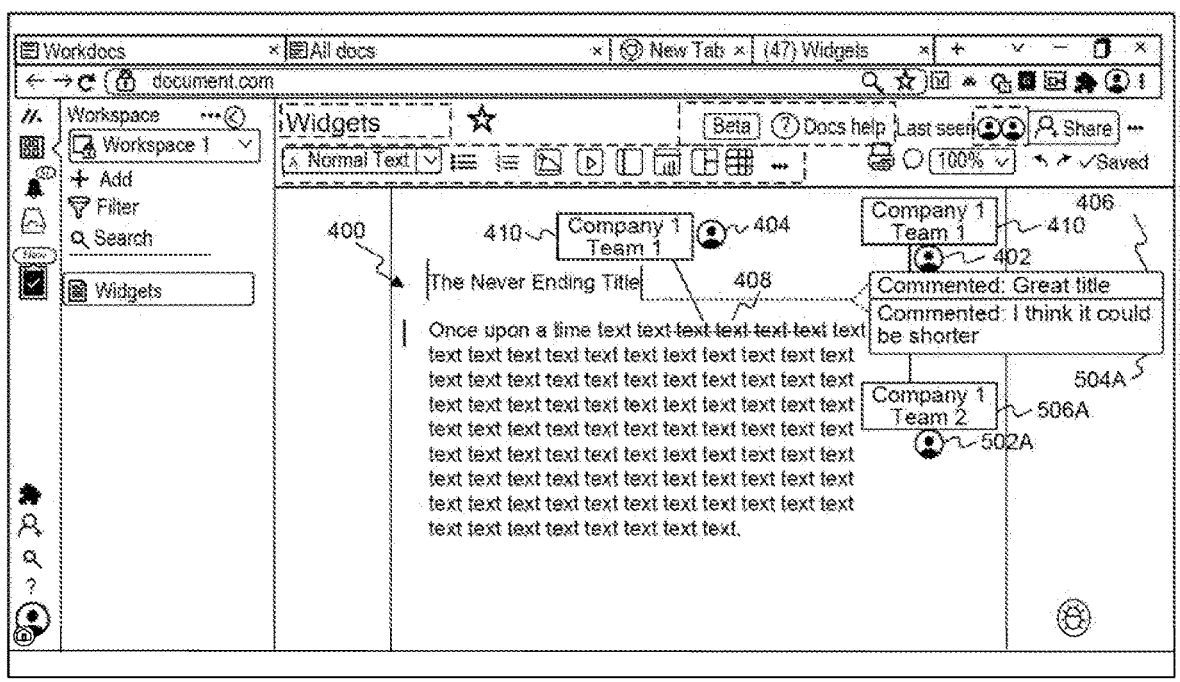
FIG. 5A illustrates an example of a first instance of a collaborative electronic document, consistent with some embodiments of the present disclosure.

For example, FIG. 5A, illustrates a display of a collaborative electronic document 400. A fifth entity 502A, represented by a thumbnail image, may be recognized as a member of a third collaborative group with permission to change alterations of the first collaborative group. Fifth entity 502A may reply to the comment "Great title" (the first alteration 406) with their own comment "I think it could be shorter" which may be the fifth alteration 504A. The third collaborative group indicator 506A may indicate that the fifth alteration 504A came from the third collaborative group. Additionally or alternatively, the fifth entity 502A may decide to also edit (not shown) the second alteration 408. For example, the fifth entity 502A may add text to the second alteration 408 and the added text (not shown), which may also be indicated by the third collaborative group indicator 506A.

Further, some embodiments of this disclosure may include receiving an attempt by a sixth entity to change the first alteration, access permissions settings, determine whether that the sixth entity lacks permission enabling change of the first alteration, and generates a duplicate version of the collaborative electronic document in which the sixth entity is permitted to change the first alteration. Generating a duplicate version of the collaborative electronic document may include copying and reproducing the information contained in a collaborative electronic document in a new electronic document. Determining that an entity lacks permission enabling change of the first alteration may include performing a lookup of authorized entities, through permission settings as discussed above, that an entity may not be authorized to change the first alteration and restricting the entity from making the change. By way of example, it may be determined that the sixth entity does not have permission to change the first alteration in the collaborative electronic document. In response to this determination, the system may generate a duplicate of the collaborative electronic document for the sixth entity to make alterations without affecting the original collaborative electronic document. For example, the first entity may be a manager with change-enabling permission while the sixth entity may be a subordinate without change-enabling permission. The sixth entity may attempt to change the first alteration, the system, through a lookup in a repository of authorized entities, may determine that the sixth entity does not have permission to make changes to the first alteration, which results in the system generating a duplicate version of the collaborative electronic document for the sixth entity to make edits such that the sixth entity may work on an independent version of the collaborative electronic document without affecting the original document.

Figure 6:
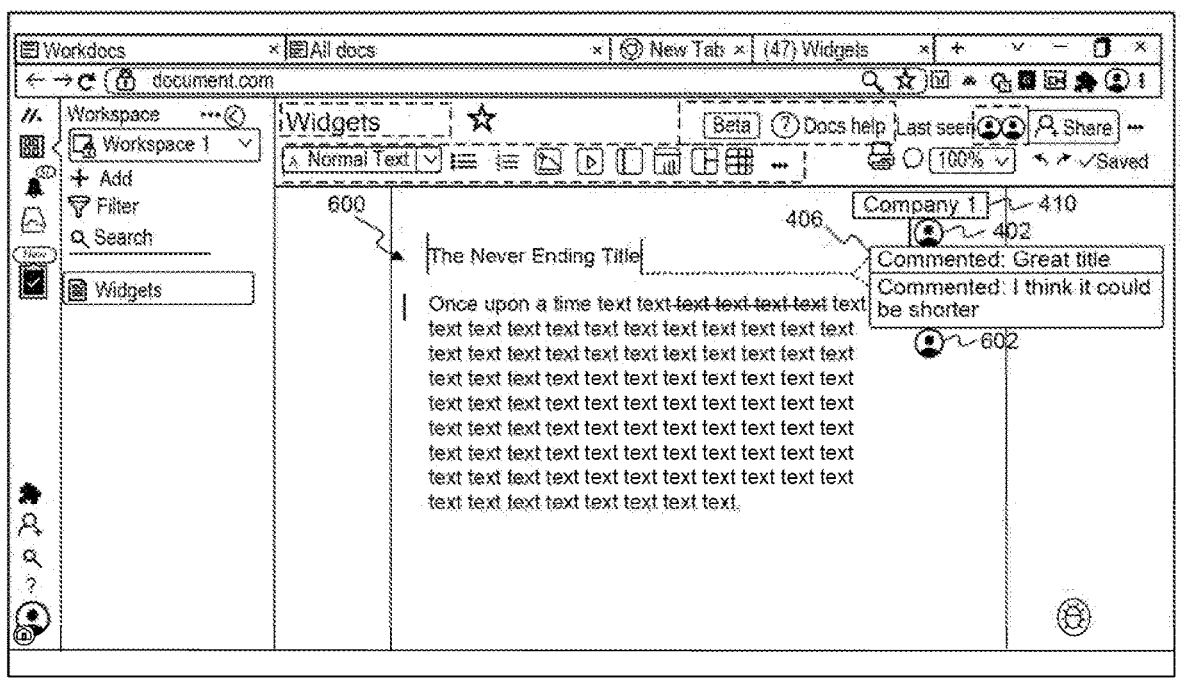
FIG. 6 illustrates an example of a duplicate version of a collaborative electronic document, consistent with some embodiments of the present disclosure.

By way of example in FIG. 6, a sixth entity 602 (identified by a thumbnail) may attempt to change the first alteration 406 in the collaborative electronic document 400 (as shown in FIG. 4). It may be determined that the sixth entity 602 does not have permission to change the first alteration, so the sixth alteration may not appear in the collaborative electronic document 400, However, a new duplicate collaborative electronic document 600 may be generated for the sixth entity that allows the sixth entity to change the first alteration without affecting the original collaborative electronic document 400. This may enable the sixth entity to edit the collaborative electronic document 400 in a duplicate copy without being delayed by the lack of permission to edit the original collaborative electronic document 400.

Some disclosed embodiments may involve rendering a display of a collaborative electronic document, wherein the rendered display includes presenting a first collaborative group indicator in association with a first alteration and a second alteration, and wherein the rendered display includes a second collaborative group indicator displayed in association with a third alteration and a fourth alteration. Rendering a display of the collaborative electronic documents may include causing a presentation of information contained in an electronic document on a device, as described previously above, such that a user associated with a computing device may view and interact with the information in the collaborative electronic document. Rendering the display may include providing the collaborative electronic document to an entity by outputting one or more signals configured to result in the presentation of the collaborative electronic document on a screen, or other surface, through a projection, or in a virtual space with the entity. This may occur, for example, on one or more of a touchscreen, a monitor, AR or VR display, or any other means previously discussed and discussed further below. The electronic word processing document may be presented, for example, via a display screen associated with the entity's computing device, such as a PC, laptop, tablet, projector, cell phone, or personal wearable device. The electronic word processing document may also be presented virtually through AR or VR glasses, or through a holographic display. Other mechanisms of presenting may also be used to enable the entity to visually comprehend the presented information. Presenting the first collaborative group indicator in association with the first alteration and the second alteration may include displaying or rendering the first collaborative group indicator corresponding to the first and second alterations in a manner that is next to, below, above, together with, in conjunction with, related to, embedded in, or otherwise connected to the first alteration and the second alteration, By way of example, both the first alteration and the second alteration may be identified as originating from the first collaborative group by their association with the first collaborative group indicator. The first collaborative group indicator may be identical for the first alteration and the second alteration. For example, the first collaborative group indicator may be a graphical rendering of a logo of a company. Additionally or alternatively, the first collaborative group indicator may be different for the first alteration and the second alteration. For example, the first collaborative group indicator in association with the first alteration may include a display of the logo of a company and a thumbnail indicating the identity of the first entity, while the first collaborative group indicator in association with the second alteration may be the display of the logo of a company and a thumbnail indicating the identity of the second entity.

As stated above, the relational terms herein such as "first," "second," "third," and so on are used only to differentiate an entity or operation from another entity or operation, and do not require or imply any actual relationship or sequence between these entities or operations. The definitions of rendering a display and presenting or displaying the collaborative group indicator in association with the alteration applies equally to the second collaborative group. However, the specific functionality associated with each collaborative group may vary. For example, the second collaborative group indicator may be below the third and fourth alterations, while the first collaborative group indicator may be next to the first and second alterations.

Figure 5B:
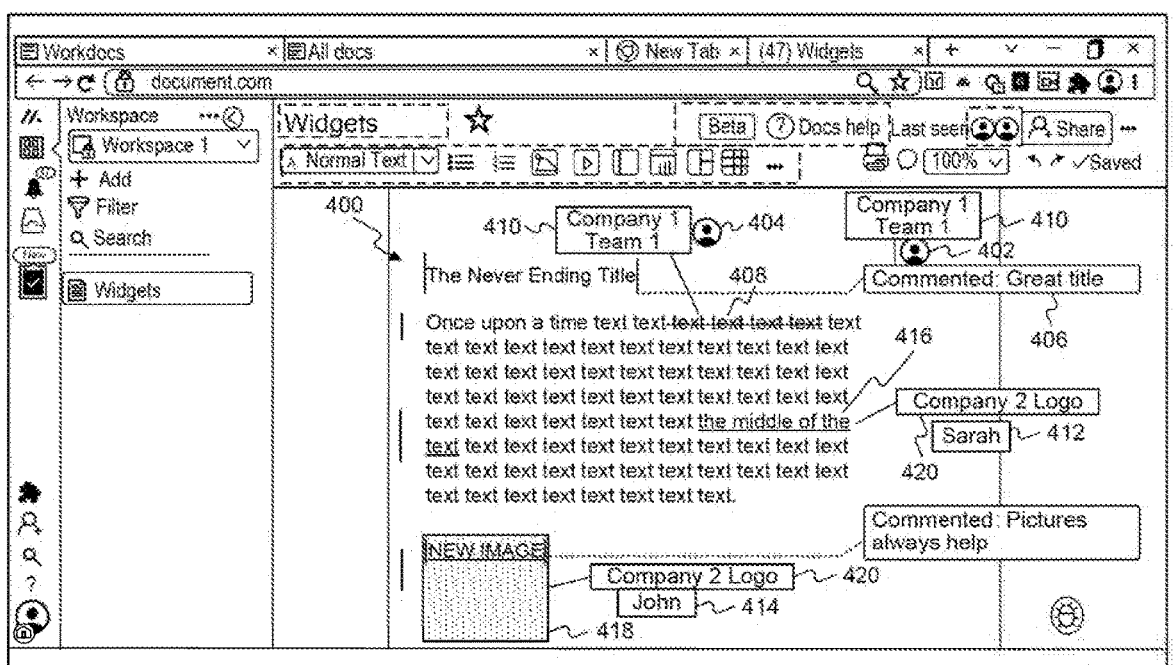
FIG. 5B illustrates an example of a second instance of a collaborative electronic document, consistent with some embodiments of the present disclosure.

For example, FIG. 5A and FIG. 5B may show a display of the same collaborative electronic document 400 at two different points in time, FIG. 5A may be at a point in time that is before FIG. 5B. FIG. 5A illustrates an example situation when a display of the rendered collaborative electronic document 400 does not show the third alteration or the fourth alteration. The third alteration 416 and the fourth alteration 418 may require approval from the third entity 414 (e.g. "John") before being displayed. FIG. 5B, a later point in time, may show a disclosed embodiment of the collaborative electronic document 400 after the third entity 414 (John) approves the alteration through an interaction with the document (e.g. clicking an approval button or any other gesture or command instructing the same) and allows the display of the third alteration 416 and the fourth alteration 418. That is, for example, the first collaborative group 410 may not be able to see the third alteration 416 and the fourth alteration 418 (e.g. FIG. 5A) until the third entity 414 approves the third alteration 416 and the fourth alteration 418, at which point the first collaborative group 410 may view the third alteration 416 and the fourth alteration 418 (e.g. FIG. 5B).

Aspects of this disclosure may include at least one processor configured to display a first collaborative group indicator in association with a first alteration and a second alteration, including a first instance of the first collaborative group indicator displayed in association with the first alteration and a second instance of the first collaborative group indicator displayed in association with the second alteration. Further, a third alteration and a fourth alteration may include a first instance of a second collaborative group indicator displayed in association with the third alteration and a second instance of the second collaborative group indicator displayed in association with the fourth alteration. An instance of the first collaborative group indicator may refer to an occasion, occurrence, display or any presentation of the collaborative group indicator. For example, multiple instances of the first collaborative group indicator may be rendered in conjunction with edits from the first and second entity alterations such that each of the alterations from the first collaborative group may be identified with a common indicator.

For example, presenting the first collaborative group indicator in association with the first alteration and the second alteration may be simultaneous, or near simultaneous as the first alteration and second alteration are made in the collaborative electronic document. Alternatively, for example, presenting the first collaborative group indicator in association with the first alteration and the second alteration may be completed after, at a time other than when the alterations are made. Some disclosed embodiments may additionally require approval before presenting the first alteration, the second alteration, or both. For example, the first alteration made by the first entity may require approval from the second entity before the first instance of the first collaborative group indicator may be displayed in association with the first alteration. This may ensure that all entities associated with the first collaborative group authorize each other's alterations before releasing the alterations to the other collaborative groups on the collaborative electronic document. Additionally, or alternatively, the first alteration my require the approval by another entity (i.e. an administrator, manager, or other user) before the first instance of the first collaborative group indicator may be displayed in association with the first alteration. Similarly, it may be required for the first entity to select an interactive element (e.g. any element in a user interface which may be interacted with through a mouse cursor, a touchable area (as on a touchscreen our touchpad), eye movement (such as with eye trackers), a gesture (such as may be detected by a camera), an application program interface (API) that receives a keyboard input, or any hardware or software component that may receive user inputs) or other means of activation before the first alteration may be displayed in association with the first collaborative group indicator. By a non-limiting example, the system may require the first entity to press a button indicating approval of the first alteration before the first alteration is displayed. Alternatively, the system may require a second entity to press a button indicating approval of the first alteration. Additionally or alternatively, the system may require both the first and the second entity to press a button indicating approval of the first alteration.

Figure 7:
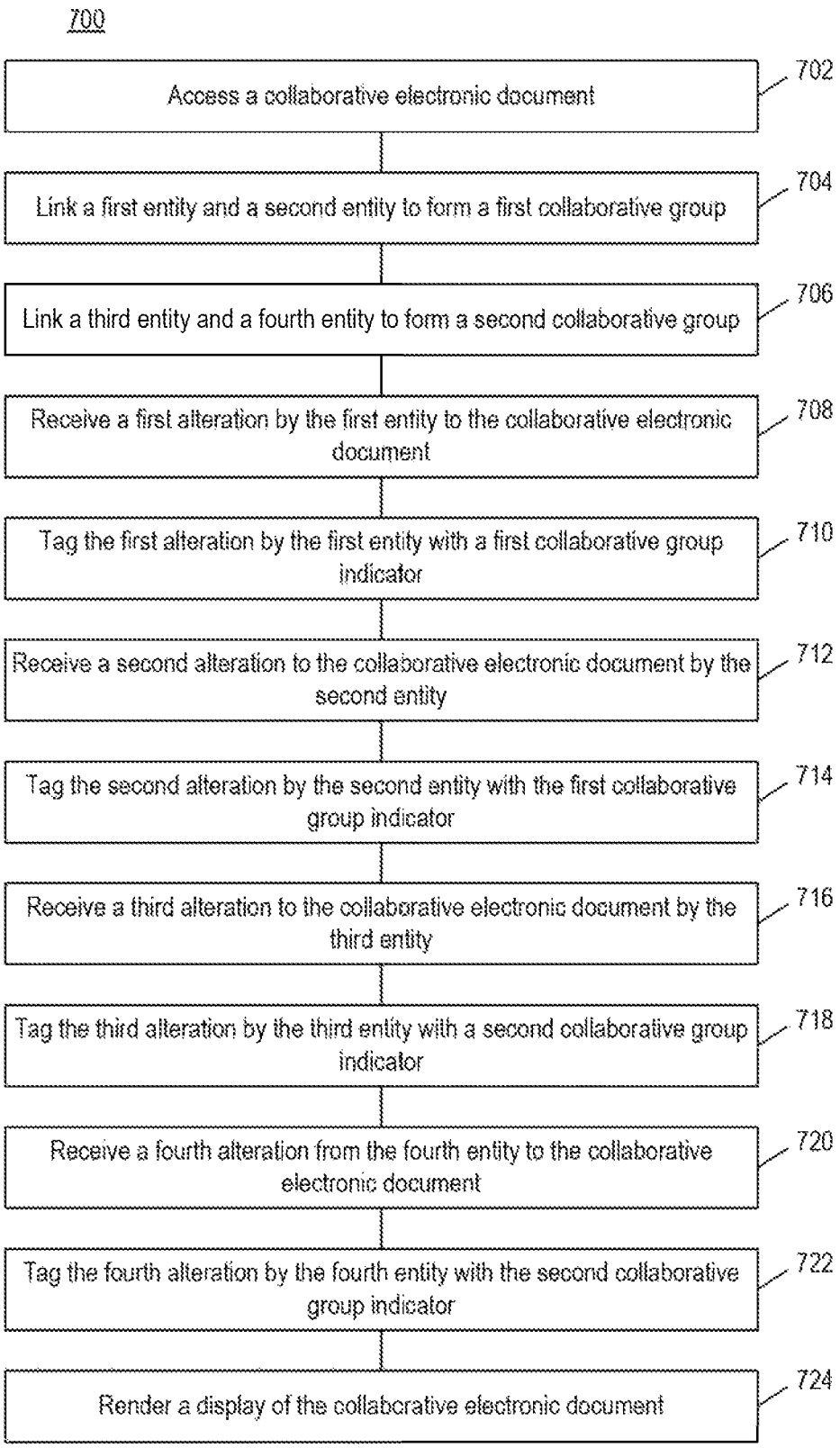
FIG. 7 illustrates a block diagram of an exemplary process for enabling simultaneous group editing of electronically stored documents, consistent with some embodiments of the present disclosure.

FIG. 7 illustrates a block diagram of an example process 700 for enabling simultaneous group editing of electronically stored documents. While the block diagram may be described below in connection with certain implementation embodiments presented in other figures, those implementations are provided for illustrative purposes only, and are not intended to serve as a limitation on the block diagram. In some embodiments, the process 700 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 4 to 6 by way of example. In some embodiments, some aspects of the process 700 may be implemented as software (e.g., program codes or instructions) that are stored in a memory (e.g., the memory portion 122 in FIG. 1) or a non-transitory computer-readable medium. In some embodiments, some aspects of the process 700 may be implemented as hardware (e.g., a specific-purpose circuit). In some embodiments, the process 700 may be implemented as a combination of software and hardware. FIG. 7 may include process blocks 702 to 724:

At block 702, the processing means may be configured to access a collaborative electronic document, consistent with the earlier disclosure.

At block 704, the processing means may involve linking a first entity and a second entity to form a first collaborative group, as discussed previously in the disclosure above.

At block 706, the processing means may be configured to link a third entity and a fourth entity to form a second collaborative group, as discussed previously in the disclosure above.

At block 708, the processing means may be configured to receive a first alteration by the first entity to the collaborative electronic document, as discussed previously in the disclosure above.

At block 710, the processing means may be configured to tag the first alteration by the first entity with a first collaborative group indicator, as discussed previously in the disclosure above.

At block 712, the processing means may involve receiving a second alteration to the collaborative electronic document by the second entity, as discussed previously in the disclosure above.

At block 714, the processing means may involve tagging the second alteration by the second entity with the first collaborative group indicator, as discussed previously in the disclosure above.

At block 716 the processing means may further be configured to receive a third alteration to the collaborative electronic document by the third entity, consistent with the earlier disclosure.

At block 718, the processing means may be further configured to tag the third alteration by the third entity with a second collaborative group indicator, as discussed previously in the disclosure above.

At block 720, the processing means may involve receiving a fourth alteration from the fourth entity to the collaborative electronic document, as discussed previously in the disclosure above.

At block 722, the processing means may involve tagging the fourth alteration by the fourth entity with the second collaborative group indicator, as discussed previously in the disclosure above.

At block 722, the processing means may be further configured to render a display of the collaborative electronic document, as discussed previously in the disclosure above.

Various embodiments of this disclosure describe unconventional systems, methods, and computer-readable media for enabling granular rollback of historical edits in an electronic document. While users may undo edits made to an electronic documents, it may be difficult to distinguish the entire document from a specific portion of a document where a user may want to undo. It may be difficult to only undo edits made to a specific portion of a document without also undoing edits made to other portions of a document. Further, it may be difficult to view a history of edits made to a specific portion of a document. It may be beneficial to enable viewing of historical edits made to a specific portion of the document. It may be beneficial to enable choosing which, if any, previous edit should be restored. It may be beneficial to allow changing only a specific portion of a document to a previous edit. By enabling granular rollback of historical edits in an electronic document, it may increase the efficiency of editing electronic documents by reducing the number of files that need to be stored in memory for version control, which thereby also increases the overall system's processing speed of processing historical edits for just a single electronic file.

Some disclosed embodiments may involve systems, methods, and computer-readable media for enabling granular rollback of historical edits in an electronic document. Edits may include any addition, deletion, rearrangement, modification, correction, or other change made to the data or information in an electronic document. Historical edits may be any edit made previously, in the past, prior to, or otherwise made at a time before the present time. An electronic document, as used herein, may be any file containing any information that is stored in electronic format, such as text files, word processing documents, Portable Document Format (pdf), spreadsheets, sound clips, audio files, movies, video files, tables, databases, or any other digital file. Granular rollback of historical edits in an electronic document may refer to any review, analysis, or assessment of past edits made to a subset, detailed display, or other specific portion of an electronic document. Additionally, enabling granular rollback may refer to allowing, permitting, or otherwise authorizing rollback of historical edits on any selected portion of information an electronic document. For example, a user may be working in an electronic document and review the previous edits made to a specific paragraph of the document, or any other organization of information in the electronic document (e.g., a character, a word, a sentence, a paragraph, a page, or any combination thereof). Granular rollback of historical edits may be stored, retrieved, and/or transmitted by a user within an electronic document. For example, the system may be configured to automatically enable the granular rollback of historical edits. Alternatively, the system may be configured to only enable granular rollback of historical edits when prompted by a user (e.g., by a toggle on and off feature).

Some disclosed embodiments may include accessing an electronic document, having an original form, Accessing may refer to gaining authorization or entry to download, upload, copy, extract, update, edit, or otherwise receive, retrieve, or manipulate data or information through an electrical medium. For example, for a client device (e.g., a computer, laptop, smartphone, tablet, VR headset, smart watch, or any other electronic display device capable of receiving and sending data) to access an electronic document, it may require authentication or credential information, and the processor may confirm or deny authentication information supplied by the client device as needed. Accessing an electronic document may include retrieving the electronic document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic document may include retrieving the electronic document from a web browser cache. Additionally or alternatively, accessing the electronic document may include accessing a live data stream of the electronic document from a remote source. In some embodiments, accessing the electronic document may include logging into an account having a permission to access the document. For example, accessing the electronic document may be achieved by interacting with an indication associated with the electronic document, such as an icon or file name, which may cause the system to retrieve (e.g., from a storage medium) a particular electronic document associated with the indication. Having an original form may include any new, initial, prior, previous, first or other edition, display, instance, or other version of an electronic document. The original form may be a new, unedited electronic document (e.g., the generation of a new document such that it is a blank document without any populated data or information). Alternatively, the original form may be an already edited or existing version of an electronic document. For example, a user may generate a new, blank document that is an original form of the document. Alternatively or additionally, a user may save an already edited document to a location on a network and that may be an original form of an electronic document. For example, a user may determine the original form of an electronic document, such as, by an input (e.g., the selection of a button) that stores information or instructions in a repository or other storage medium that, when executed by at least one processor, may identify the selected version as the original form. For example, a user input may add metadata to a version (e.g., the original form of an electronic document) to link and store the metadata with that version of the electronic document in a repository. Alternatively or additionally, the system may automatically determine the original form of an electronic document. By way of a non-limiting example, the system may be configured to automatically store, in a repository or other storage medium, the data and information associated with an electronic document as the original form after the first time the electronic document is saved. Similarly, for example, the system may be configured to automatically store, in a repository or other storage medium, the data and information associated with an electronic document as the original form when the electronic document is first created.

Figure 8:
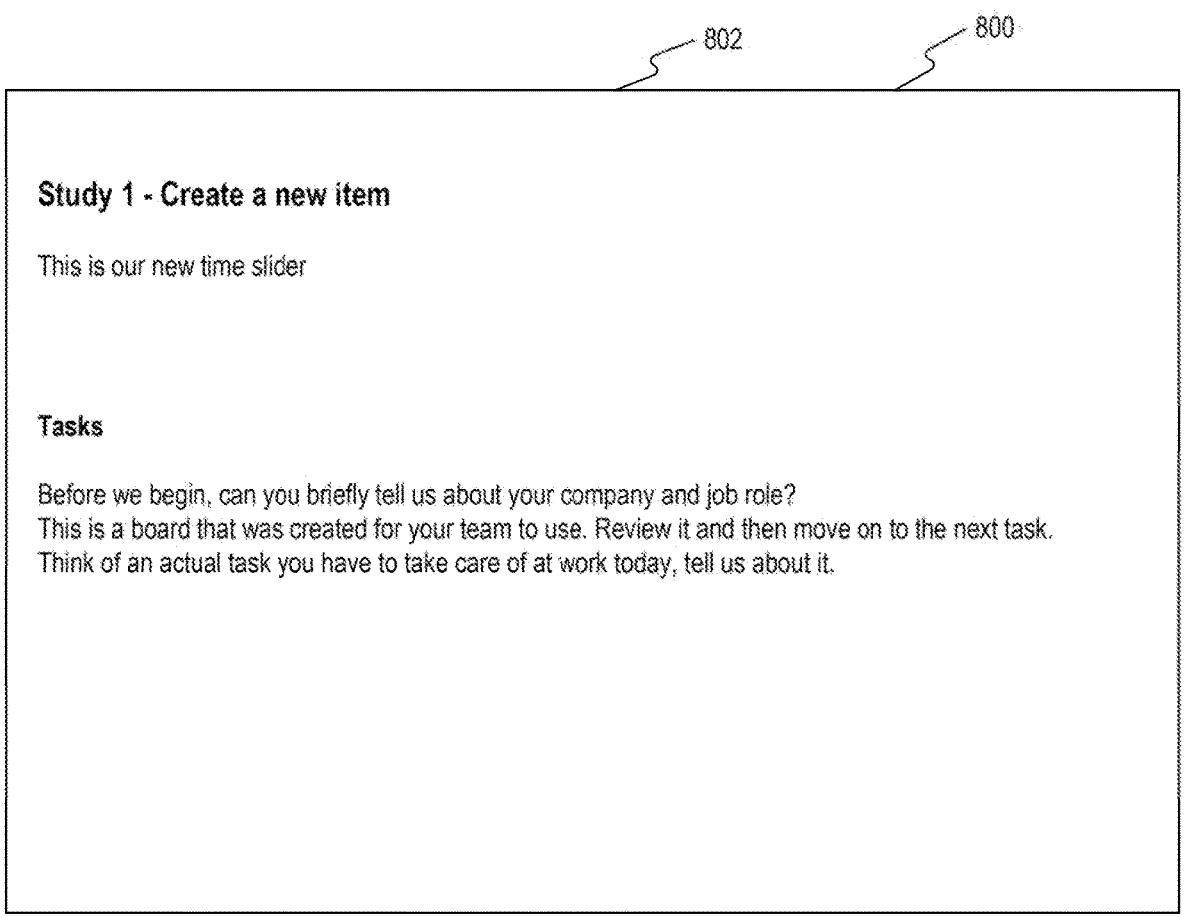
FIG. 8 illustrates an example of a first instance of an electronic document, consistent with some embodiments of the present disclosure.

FIG. 8, for example, may be the original form 802 of electronic document 800. For example, in FIG. 2, a user may save, via network 210, the original form of an electronic document (e.g., 802 of FIG. 8) in repository 230-1. Repository 230-1 may be configured to store software, files, or code, such as the original form of an electronic document developed using computing device 100 or user device 220-1. A computing device 100, user device 220-1, or a different user device 220-2 may access, as discussed above, the electronic document in its original form from repository 230-1. Repository 230-1 may further be accessed by computing device 100, user device 220-1, or other components of system 200 for downloading, receiving, processing, editing, or viewing, the electronic document. Repository 230-1 may be any suitable combination of data storage devices, which may optionally include any type or combination of slave databases, load balancers, dummy servers, firewalls, back-up databases, and/or any other desired database components. In some embodiments, repository 230-1 may be employed as a cloud service, such as a Software as a Service (SaaS) system, a Platform as a Service (PaaS), or Infrastructure as a Service (IaaS) system. For example, repository 230-1 may be based on infrastructure of services of Amazon Web Services™ (AWS), Microsoft Azure™, Google Cloud Platform™, Cisco Metapod™, Joyen™, vmWare™, or other cloud computing providers. Repository 230-1 may include other commercial file sharing services, such as Dropbox™, Google Docs™ or iCloud™. In some embodiments, repository 230-1 may be a remote storage location, such as a network drive or server in communication with network 210. In other embodiments repository 230-1 may also be a local storage device, such as local memory of one or more computing devices (e.g., computing device 100) in a distributed computing environment.

Some disclosed embodiments may include recording at a first time, first edits to a specific portion of an electronic document, recording at a second time, second edits to the specific portion of the electronic document, and recording at a third time, third edits to the specific portion of the electronic document. The relational terms herein such as "first," "second," and "third" are used only to differentiate an edit or operation from another edit or operation, and do not require or imply any actual relationship or sequence between these edits or operations. Recording edits may refer to storing, saving, keeping, maintaining, or preserving alterations made to an electronic document in memory or repository (e.g., a data structure). Recording may be done automatically or manually. For example, as discussed in more detail below, the edits may be recorded at a default or predetermined time intervals (e.g., by seconds, minutes, hours, days, or any other time increment). Additionally or alternatively, edits may be recorded when prompted by user action. For example, edits may be recorded when a user saves the electronic document. Similarly, for example, edits may be recorded when a user closes the electronic document. Further, for example, edits may be recorded by the selection of an interactive element (e.g., pressing a button). The edits may be stored in any non-transitory computer-readable medium. At least one processor may then perform a lookup of permission settings to confirm whether the computing device has authorization to make the edit. In a situation where authorization is confirmed, the system may then implement and store the edit with the electronic document such that any other computing devices accessing the document may retrieve the recorded edit. In another situation where authorization is not confirmed for the editing entity, the system may lock the information in the electronic document such that the information in the electronic document is unable to be altered by the editing entity.

Edits, as referenced above, may refer to any addition, deletion, rearrangement, modification, correction, or other change made to the data or information in an electronic document. For example, edits to an electronic document may be made by one entity, by a group, or by the processor (e.g., via a logical rule for carrying out the task of making an alteration). Alternatively, edits to an electronic document may be made my more than one entity. Recording edits at a time may include any storing an instance of the completed edits at a distinct point in time (e.g., in response to an input from a user indicating an instruction to record), instance, occurrence, interval, or other measure of time that may be determined according to preference or according to a default. For example, a first time may be any point in time occurring before a second time. Alternatively or additionally, a first time may be any interval of time occurring before any second time. A specific portion of the electronic document may be any subset, piece, segment, page, section, or other part of the electronic document. For example, the electronic document may be a word processing document, and the specific portion of the electronic document may be a letter, word, sentence, part of a sentence, paragraph, page, or any other portion of the electronic word processing document. For example, recording at a first time, first edits to a specific portion of the electronic document may include associating metadata with the edits that may be stored in a repository so at least one processor may identify the instance of those edits. Recording at a first time, first edits to a specific portion of the electronic document may involve, for example, storing the addition of a new sentence to the specific portion of the electronic document in a repository.

By way of example, in FIG. 1 and FIG. 2, at least one processor may implement recording a first edit made to a specific portion of an electronic document by storing the edit in storage 130 in FIG. 1, or in a repository 230-1 in FIG. 2. Similarly, the at least on processor may implement recording a second edit made to the specific portion of an electronic document by storing it in storage 130 in FIG. 1, or in a repository 230-1 in FIG. 2. A computing device 100 or a user device 220 may access, as discussed above, the stored edits and may display (e.g., on a screen, other surface, through a projection, or in a virtual space) data and information from the first edit, the second edit, or both the first edit and the second edit, as discussed in more detail below.

Some disclosed embodiments may include receiving at a fourth time, a selection of a specific portion. Receiving a selection may include the system accepting a user input from a computing device associated with a user that indicates instructions to make a selection. The user input may be transmitted over a network to a repository where the electronic document is stored. A selection may be any action taken to elect, pick, designate, or otherwise choose a portion of the electronic document. For example, a selection may be a mouse click, a user input, a mouseover, a highlight, a hover, a touch on a touch sensitive surface, a keystroke, a movement in a virtual interface, or any other action indicating a choice of a specific portion of the electronic document. For example, a selection may be using a mouse to click and highlight (e.g., by mouse click and drag) of a specific portion of an electronic document. Additionally or alternatively, a selection may require an additional click of an activatable element, such as a button.

Figure 9:
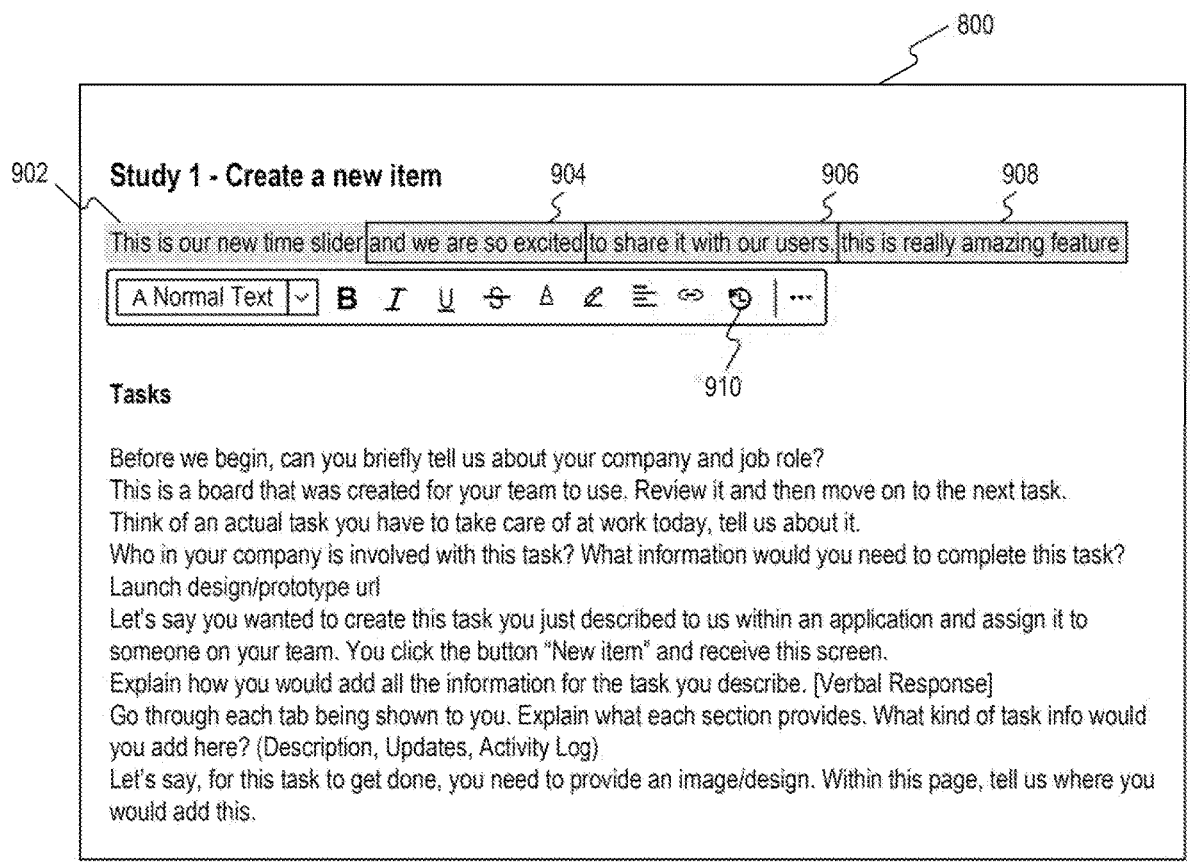
FIG. 9 illustrates an example of a second instance of an electronic document, consistent with some embodiments of the present disclosure.

In FIG. 9, for example, the selection may be made by highlighting the specific portion of text 902 (e.g., "This is our new time slider and we are so excited to share it with our users, this is really amazing feature") and then clicking an icon button 910, For example, selecting a specific portion may include any signal or indication that meets a threshold for carrying out instructions for rendering a historical interface (see below for more detail).

In response to a selection, some disclosed embodiments may include, rendering a historical interface enabling viewing of an original form of the selection, first edits, second edits, and third edits. Rendering the historical interface may include causing a display of data or information in the historical interface via a display device. For example, previous versions (e.g., the original form of the selection, the first edits, the second edits, or the third edits) may be displayed, which may require the at least one processor to perform a lookup of the previous version in storage or a repository, and then the system may implement and display the previous version in the historical interface. Each previous version (e.g., the original form of the selection, the first edits, the second edits, or the third edits) may, for example, include metadata associated with the version allowing the at least one processor to identify the version and distinguish it from the other versions. A historical interface may refer to one or a combination of a graphical user interface (GUI), software interface, a web page, an application interface, or any other interface that enables interaction between a human and a machine. The historical interface may include, in some embodiments, an interface with activatable elements that displays previous, prior, past, and/or current versions of the electronic document or portions of the electronic document. As discussed above, the previous versions (e.g., the original form of the selection, the first edits, the second edits, or the third edits) may be stored in a repository or other storage medium. The interactive elements included in the historical interface may include, for example, a mouse cursor, a touchable area (as on a touchscreen), keyboard input, or any hardware or software component that can receive user inputs. The historical interface may include a pop-up window, a webpage, a drop-down menu or any graphical user interface element.

For example, in response to the selection, a rendering of the historical interface may appear inside of, on top of, above, below, next to, or otherwise associated with a rendering of an electronic document. For example, the historical interface may appear in the same window as the electronic document. Alternatively, the historical interface may appear in a new window. The historical interface may include one or more interactable visual elements, such as buttons, sliders, dials, or other visual interactable graphics. Enabling viewing of an original form of a selection and edits may refer to any process or procedure that causes a display (e.g., on a screen, other surface, through a projection, or in a virtual space) of the original form of the selection, the first edits, the second edits, and the third edits. For example, as discussed above, the original form and edits made to the selection may be stored in a repository and include metadata so the at least one processor may identify the original form or edit. For example, all or some of the original form of the selection, the first edits, the second edits, and the third edits, or any combination thereof may be displayed in the historical interface at the same time. Alternatively, one of the original form of the selection, the first edits, the second edits, and the third edits may be displayed in the historical interface at a time. For example, user interaction may enable changing the display from one edit to another with a historical interface that may include a slider that enables a user to change between different displays or forms of the specific portion of the electronic document, such as, a display of the original form of the selected portion, a display of the selected portion after first edits were made to the electronic document, a display of the selected portion after second edits were made to the electronic document, and a display of the selected portion after the third edits were made to the electronic document. In response to the user interacting with the historical interface, such as moving the slider to a marker, discussed in more detail below, associated with an edit, the processor may look up additional data or information stored and associated with the edit, for example, the day and time the edits were made.

Figure 10A:
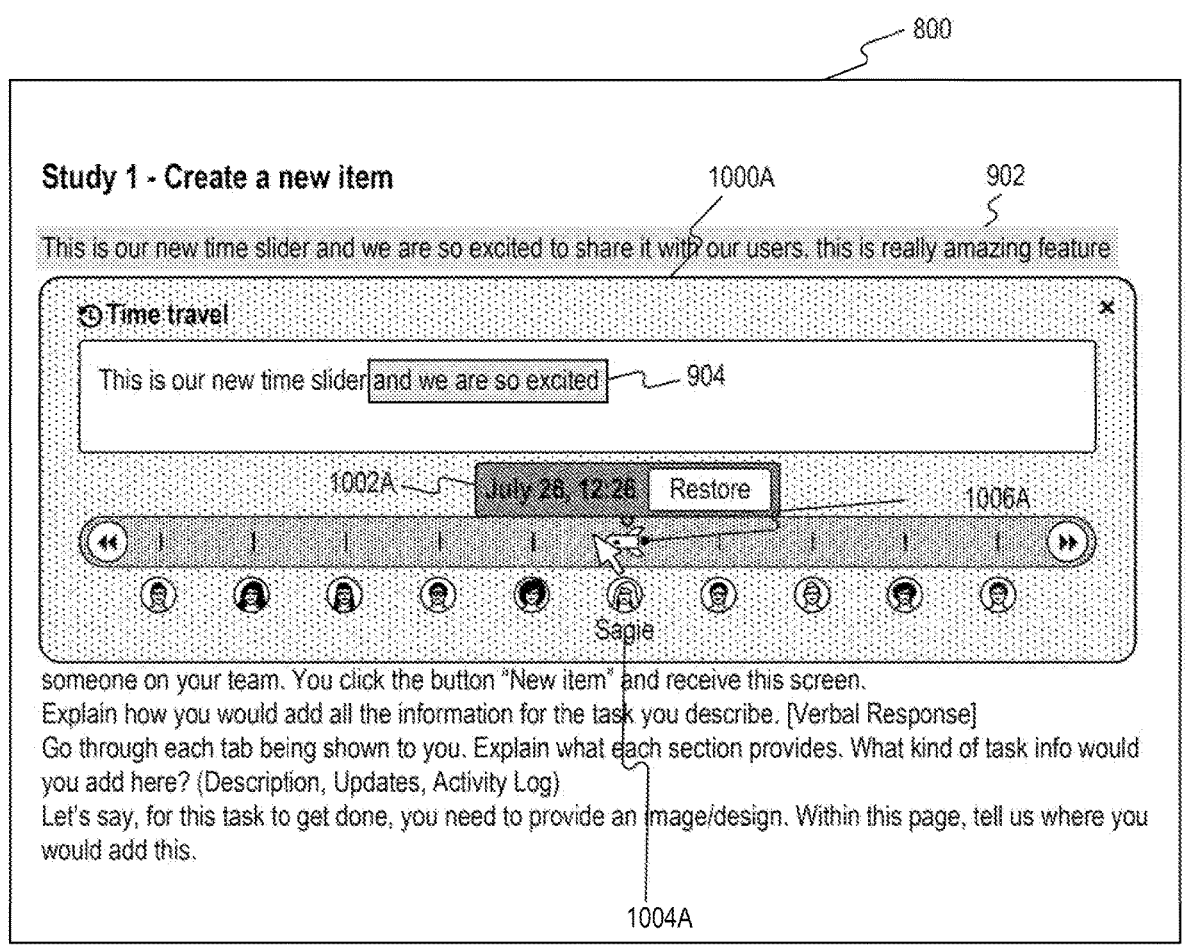
FIG. 10A illustrates an example of a third instance of an electronic document, consistent with some embodiments of the present disclosure.
Figure 10B:
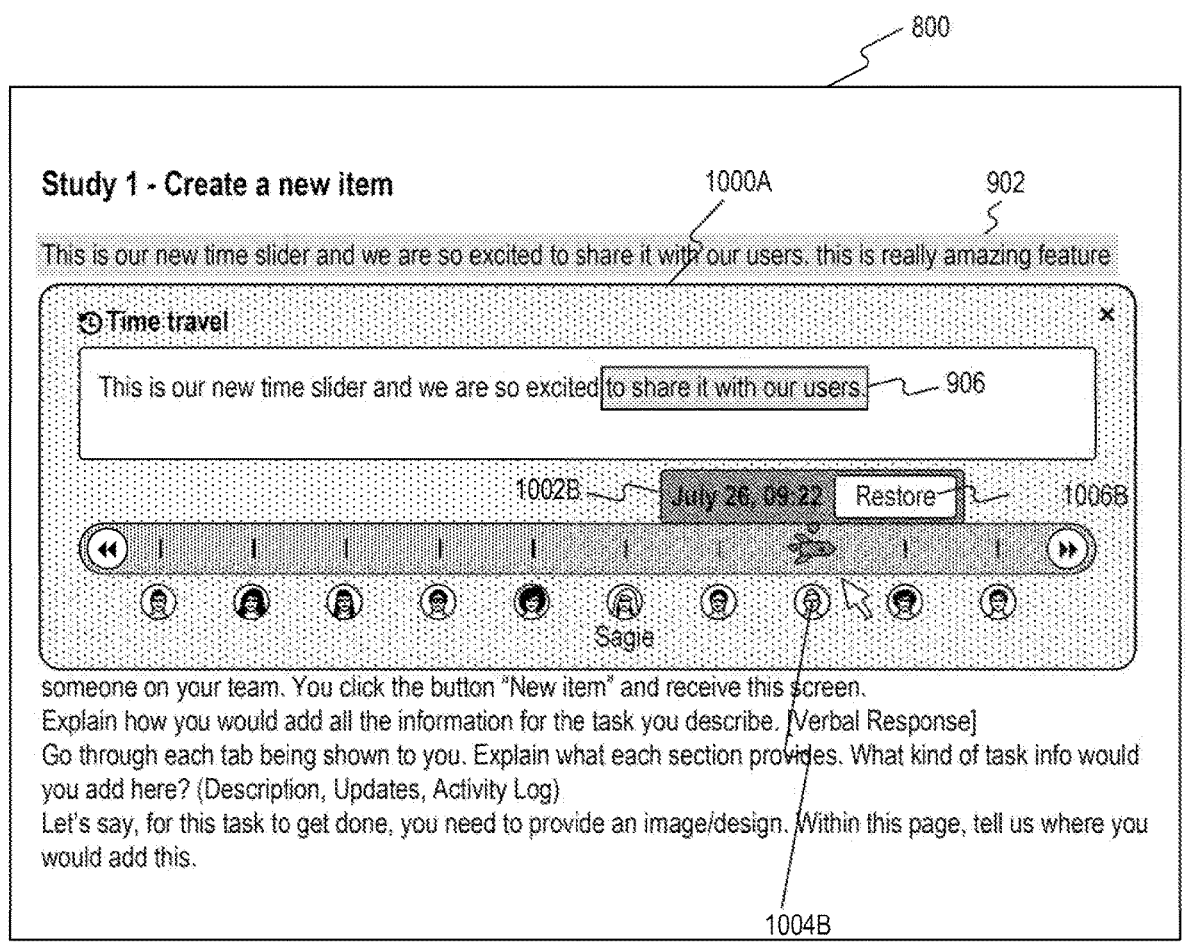
FIG. 10B illustrates an example of a fourth instance of an electronic document, consistent with some embodiments of the present disclosure.
Figure 10C:
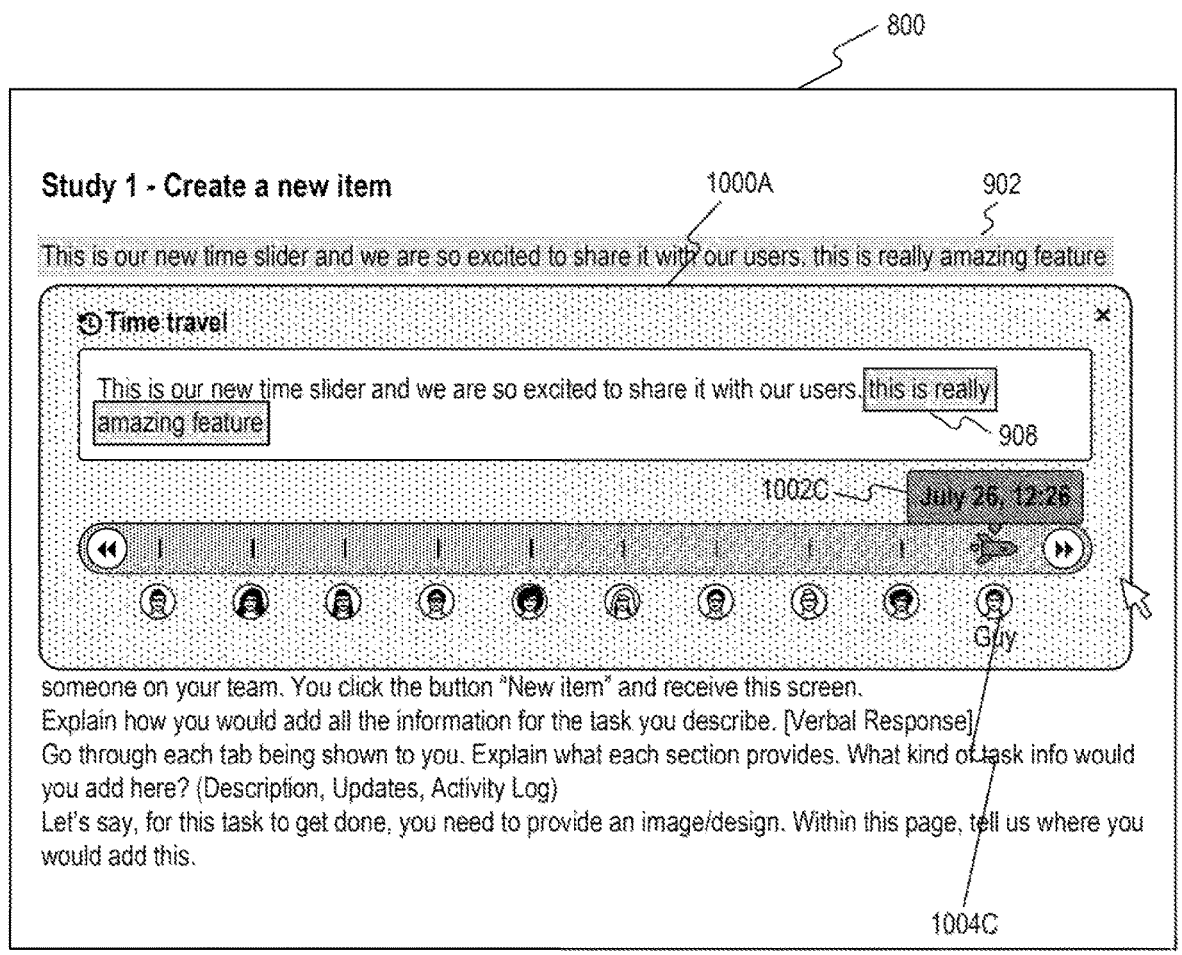
FIG. 10C illustrates an example of a fifth instance of an electronic document, consistent with some embodiments of the present disclosure.

For example, FIG. 10A to FIG. 10C may include exemplary renderings of a historical interface 1000A. For example, in FIG. 10A to FIG. 10C, after a selection of a specific portion of a document 902 is made, as discussed above, (e.g., "This is our new time slider and we are so excited to share it with our users, this is really amazing feature"), a historical interface 1000A may be rendered on a display of an associated computing device. The historical interface 1000A may enable viewing of the original form of the selection (not shown) by presenting the original form or presenting a link or any other activatable element to access the original form. As shown in FIG. 10A, the historical interface 1000A may enable viewing of the selected portion 902 after first edits 904 ("and we are so excited") were made at a first time 1002A. As shown in FIG. 108, the historical interface 1000A may enable viewing of the second edits 906 (e.g., "to share it with our users.") made at a second time 1002B. And as shown in FIG. 10C, the historical interface 1000A may enable viewing of the third edits 908 (e.g., "this is really amazing feature") made at a third time 1002C.

In some disclosed embodiments, a historical interface may include an interactive timeline enabling rollback of edits to markers on the timeline denotating the original form of the selection, the first edits, the second edits, and the third edits. An interactive timeline may refer to any rendered interface (e.g., a graphical user interface) that may include any number of activatable visual elements that may be activated via any interaction (e.g., a cursor hover, mouse click, gesture, keyboard input) that send instructions to the processor, such as for retrieving historical edits from memory and for presenting those edits on a display. For example, as discussed above, an interactive timeline may allow a user to change between different displays, versions, or forms of the specific portion of the electronic document selected. For example, each marker on the interactive timeline may be associated with a different version of the electronic document and, as discussed above, each version (e.g., the original form and each edit) may be stored in a repository and include metadata so the at least one processor may identify the and display the version associated with each marker.

Markers on the timeline may include any visual rendering such as a sign, dash, symbol, icon, pointer, or other indicator that denotes, distinguishes, or represents a time in which edits were made in an electronic document. For example, one or any combination of the original form of the selection, the first edits, the second edits, and the third edits may be denoted by markers on the timeline and may be rendered at specific locations in the timeline to suggest a relative time an edit was made in comparison to other edits or the original form. Markers on a timeline may represent different edits made to the electronic document. For example, a first marker on the timeline may indicate first edits made at a first time. Similarly, a second marker on the timeline may indicate second edits made at a second time. Each marker may represent different edits made to the specific portion of the electronic document. For example, as discussed above, the system may perform a lookup and display the historical edits associated with the marker selected by a user. Alternatively, two or more markers may render the same display, for example, if no edits were made to the specific portion of the electronic document between two or more time intervals represented by markers. Enabling rollback of edits to 4*t*) markers on the timeline may refer to authorizing a user to interact with the timeline to activate the interactable elements (e.g., the markers) that may cause the processor to retrieve historical edits associated with each of the markers available on the timeline. Rollback may include causing a re-rendering of a display to present historical edits at a particular time. Selecting a marker (e.g., by a mouse click, gesture, cursor movement, or any other action that results in the selection of a marker) on the timeline may display edits associated with that marker. For example, if the first marker on the timeline represents the first edits made at a first time, selecting the first marker may render a display of the first edits. Similarly, if the second marker on the timeline represents the second edits made at a second time, a selection of the second marker may render a display of the second edits, A marker on the timeline may represent the original form of an electronic document. Further, a marker on the timeline may represent the most recent, or current form of the document.

For example, in FIG. 2, a historical interface with markers may be displayed on user device 220-1, and a user may select, via an activatable element on user device 220-1, one of the markers. In response to the selection, the system, via network 210, may look up in repository 230-1 the historical edit associated with the selected marker. For example, in FIG. 10A, a selection of a marker associated with edits may be made by moving a rocket slider 1006A to a marker location. For example, selecting a marker associated with the first edits 1004A may enable a rollback of the selected portion to the first edits 904 ("and we are so excited"), made at a first time represented by a time indicator 1002A. Similarly, as shown in FIG. 10B, selecting a marker associated with the second edits 1004B may enable a rollback of the selected portion to the second edits 906 ("to share it with our users."), made at a second time represented by a time indicator 1002B. Further, in FIG. 10C, selecting a marker associated with the third edits 1004C may enable a rollback of the selected portion to the third edits 908 ("this is really amazing feature"), made at a third time represented by a time indicator 1002C. The marker associated with the third edits 1004C may be the most recent edits made to the specific portion of the electronic document 902.

In some disclosed embodiments, the first edits may be made by a first entity, the second edits may be made by a second entity and the third edits may be made by a third entity, and the markers may enable identification of a particular entity associated with a particular edit. In further disclosed embodiments the markers may indicate an identity of an associated entity responsible for an associated edit. An entity may include a person, client, group, account, device, system, network, business, corporation, or any other user accessing an electronic document through an associated computing device or account. Markers enabling identification of a particular entity associated with a particular edit may include visual indicators linking, detecting, recognizing, classifying, associating, or otherwise determining a relationship or connection between edits made to an electronic document with an entity. A particular edit may be any alteration made to an electronic document, such as any of the first, second, and third edits. Markets identifying an entity responsible for an associated edit may refer to any visual indicator that presents information associated for a responsible entity or account that made a correlating alteration to an electronic document. For example, a computing device may associate metadata with any edit made to an electronic document with data or information associated with an entity that makes each edit, and the system may be configured to store the metadata with the edit in a repository. For example, based on one or more settings, conditions, instructions, or other factors, a system may be configured to identify the entity responsible for an associates edit. Identifying information may include the IP address, MAC address, the user ID associated with a user device (such as user device 220 of FIG. 2), or any other comparable information that can be used to identify a particular user account, a user device, information of a user (e.g., name, image, email address), or other means of identifying a specific entity. In some embodiments, edits made by a specific user device may be associated with an entity, information regarding the specific user device may be stored as metadata with the edit such that the processor may retrieve the metadata and present an indicator identifying the specific user or associated computing device that is responsible for the edit. The first edits may be made by a first entity, and the processor may record, as discussed above, the identity of the first entity with the first edits in a repository. As a result, when receiving a selection of a portion of the document including the first edits, the rendered historical interface may present a marker representing when the first edits were made, and the marker may include any visual indicator representing and/or identifying the first entity, such as an avatar, a thumbnail image, alphanumeric text, or a combination thereof. Additionally, the second edits may be made by a second entity, and a second marker representing when the second edits may include any identifying visual indicator associated with the second entity, similar to the markers of the first entity. When markers are rendered on a historical interface, each marker may be rendered in similar or different manners. For example, a first marker associated with when a first edit was made may include a graphical indicator of a depiction of a llama to represent a first entity responsible for making the first edit. In the same historical interface, a second marker associated with when a second edit was made may include a visual indicator including textual information such as initials or a name that identifies a second entity responsible for making the second edits.

In FIG. 10A, an exemplary historical interface 1000A may include markers presented as thumbnail images identifying the particular entity associated with a particular edit. One marker 1004A may include a thumbnail identifying the particular entity (e.g. "Sagie") associated with the particular edit 904.

In some disclosed embodiments the first edits, the second and the third edits may be each associated with a common entity. Being associated with a common entity may refer to each of the first, the second, and the third edits being made by or attributed to the same, similar, equivalent, or other associated entity or entities. For example, a common entity may be a person, client, group, account, device, system, network, business, corporation, or any other user or users accessing an electronic document through an associated computing device or account. A common entity on an associated computing device may make multiple edits to an electronic document, such as the first edits, the second edits, and the third edits as discussed previously above. Additionally or alternatively, the first edits, the second edits, and the third edits may be made on different user devices associated with a common entity (e.g., each of the edits are made by different employees at the same company). The first edit, second edit, and third edit may be represented by different markers, or may be represented by a common marker.

For example, in FIGS. 10A to 10C, each marker associated with edits, may be associated with different entities. For example, the marker associated with the first edits 1004A in FIG. 10A may be associated with a user device ("Sagie's device"). The marker associated with the third edits 1004C may be associated with a different user device ("Guy's device"). In alternative embodiments not shown, the markers in the historical interface may be associated with a common entity, such as the same user device, the same user account, or member of the same company.

Some disclosed embodiments may include applying a time interval to document edits wherein selection of a particular marker may cause a presentation of changes that occurred during the time interval. In further disclosed embodiments, the time interval may be user-definable. A time interval may be any period, duration, length, or other amount of time that may be defined with a beginning and end time. The time interval may be defined by the system. For example, the time interval may be a default time interval, instructing the system to record edits in a repository at each default time interval. Additionally and alternatively, the time interval may be manually or automatically defined. For example, the system may require a user to input a time interval to record edits in a repository at each input time interval. Applying a time interval to document edits may include assigning, allocating, or otherwise choosing a time interval during which edits are made and recorded in a repository, as discussed above, as occurring during that time interval. For example, as discussed above, edits may be every change or any change made over a time interval. Applying the time interval may include sending instructions to the at least one processor to record in a repository the edits made during the time interval. The edits made during the time interval may, for example, store metadata with the edits in a repository so that the at least one processor may perform a lookup in a repository for edits that have a timestamp within the time interval. A presentation of changes that occurred during the time interval may include causing a display of the data and information stored in a repository associated with the edits made during a time interval via a display device. The selection of a particular marker causing presentation of changes that occurred during the time interval may include, for example, displaying the data and information associated with the changes that occurred during a time interval on a user device. A time interval may be considered to be user-definable when the time interval is determined, defined, assigned, or otherwise designated by a user or any other entity on an associated computing device of the electronic document. For example, the time interval may be defined by an administrator, manager, group, team, or other authorized individuals or entities. For another example, there may be no edits made to a specific portion of the electronic document during a time interval (e.g., no alterations have been made). Alternatively, there may be edits to the specific portion of the electronic document during a time interval.

For example, an authorized user on a user device 220-1 or a computing device 100 of FIGS. 1 and 2 may assign a time interval of one hour to an electronic document. The system may carry out instructions to record edits to the electronic document every hour and store the edits in a repository 230-1. The user may select, via an activatable element on a historical interface, a particular marker, which may represent a specific hour. As discussed above, in response to the user's selection of the specific hour, the at least one processor may perform a lookup in a repository for the edits made during that hour interval and may display the edits made during the particular hour on a user device. Similarly, and as discussed above, if the user selects a different marker, representing a different hour, the at least one processor may perform a lookup in a repository for the edits made during that different hour interval and may display the edits made during the different hour interval on a user device.

In some disclosed embodiments the historical interface may be configured to simultaneously display the first edit, the second edit, and the third edit. Simultaneously display may mean presenting any combination of or all of the first edit, the second edit, and the third edit at the same time or near the same time. Display, as used herein, may include any visualization of data associated with the first edit, the second edit, and the third edit. For example, a historical interface may display the first edit above the second edit and the second edit above the third edit. This may allow a user to compare the edits at or near the same time. For example, the at least one processor may retrieve from the repository data and information associated with each edit (e.g., an original form, a first edit, a second edit, and/or a third edit) and may render a historical interface enabling viewing of the edits at the same time. In other examples, the historical interface may render a display of just the markers associated with each of the first, second, and third edits at the same time.

Some disclosed embodiments may include co-displaying a timeline in a vicinity of a specific portion of an electronic document. Co-displaying a timeline in a vicinity of a specific portion of an electronic document may include enabling the visualization of a historical interface and a specific portion of the electronic document at the same time, or near the same time in a common presentation on a display. For example, the historical interface may be shown above, below, next to, together with, side by side with, or otherwise near the specific portion of the electronic document. This may enable a user to compare the specific portion of the electronic document selected with one or more of the edits made to the electronic document.

For example, in FIG. 10A, the historical interface 1000A may appear as a pop-up window below the specific portion of the electronic document 902, and as a window above the rest of the information displayed in the electronic document.

Some disclosed embodiments may include receiving an election of one of the original form of the electronic document, the first edits, the second edits, and the third edits, and upon receipt of the election, presenting a rolled-back display reflecting edits made to the specific portion of the electronic document, the rolled-back display corresponding to a past time associated with the election. Receiving an election of one of the original form of the electronic document, the first edits, the second edits, or the third edits may include receiving an input from an associated computing device of a user or account that indicates an intent for choosing, picking, deciding, appointing, or otherwise selecting (e.g., by a mouse click, gesture, cursor movement, or any other action by a user) the original form of the electronic document, the first edits, the second edits, or the third edits. Receiving an election may be a data input from a computer device. For example, receiving an election may include any signal or indication that meets a threshold for carrying out instructions for presenting a rolled-back display, such as performing a lookup of data or information stored in a repository associated with the election, A rolled-back display reflecting edits made to the specific portion of the electronic document may include the presentation of any recorded version of the specific portion of the electronic document as discussed previously above. Presenting a rolled-back display reflecting edits made to the specific portion of the electronic document upon receipt of the election may include outputting one or more signals configured to result in the rendering of the alterations to the information in the specific portion of the electronic document associated with the previously received election on any display methods, as described herein. The rolled-back display corresponding to a past time associated with the election may include the presentation of the selected version. For example, a user may select the first edits, and in response, the system may perform a lookup of the data and information stored in a repository associated with the first edits and present the first edits on a display device, as discussed previously above.

For example, after receiving an election of the original form (e.g., by selecting a graphical indicator associated with the original form on the historical interface), the rolled-back display may show the specific portion of the electronic document in an original form (e.g., before the first edits, the second edits, or the third edits were made). Alternatively, after receiving an election of the first edits in the historical interface, the rolled-back display may show the information in the specific portion of the electronic document as it existed after the first edits were made to the specific portion. The rolled-back display reflecting edits made to a specific version of the electronic document may present only the rolled-back display for the specific portion of the electronic document selected. For example, receiving an election of the original form may present a rolled-back display of the original form of the specific portion of the electronic document, while the rest of the electronic document (i.e. the portion of the electronic document that was not selected) may remain unchanged. An election may include recording the selection of a new edit to the electronic document. For example, an election may be recorded and another selection of the specific portion of the electronic document may render a historical interface that includes the election as an edit to a specific portion of the electronic document.

For example, FIG. 11 may represent a presentation of a rolled-back display 1100 reflecting edits made to a specific portion of the electronic document. For example, as discussed above, FIG. 10B may show a historical interface 1000A enabling viewing of the second edits 906 (e.g., "to share it with our users.") made at a second time 1002B to a specific portion of the electronic document 902 (e.g., "This is our new time slider and we are so excited to share it with our users, this is really amazing feature"). An election may be received by clicking the "Restore" button 1006B. After the election is made, for example, FIG. 11 may show a rolled-back display 1100.

Figure 12:
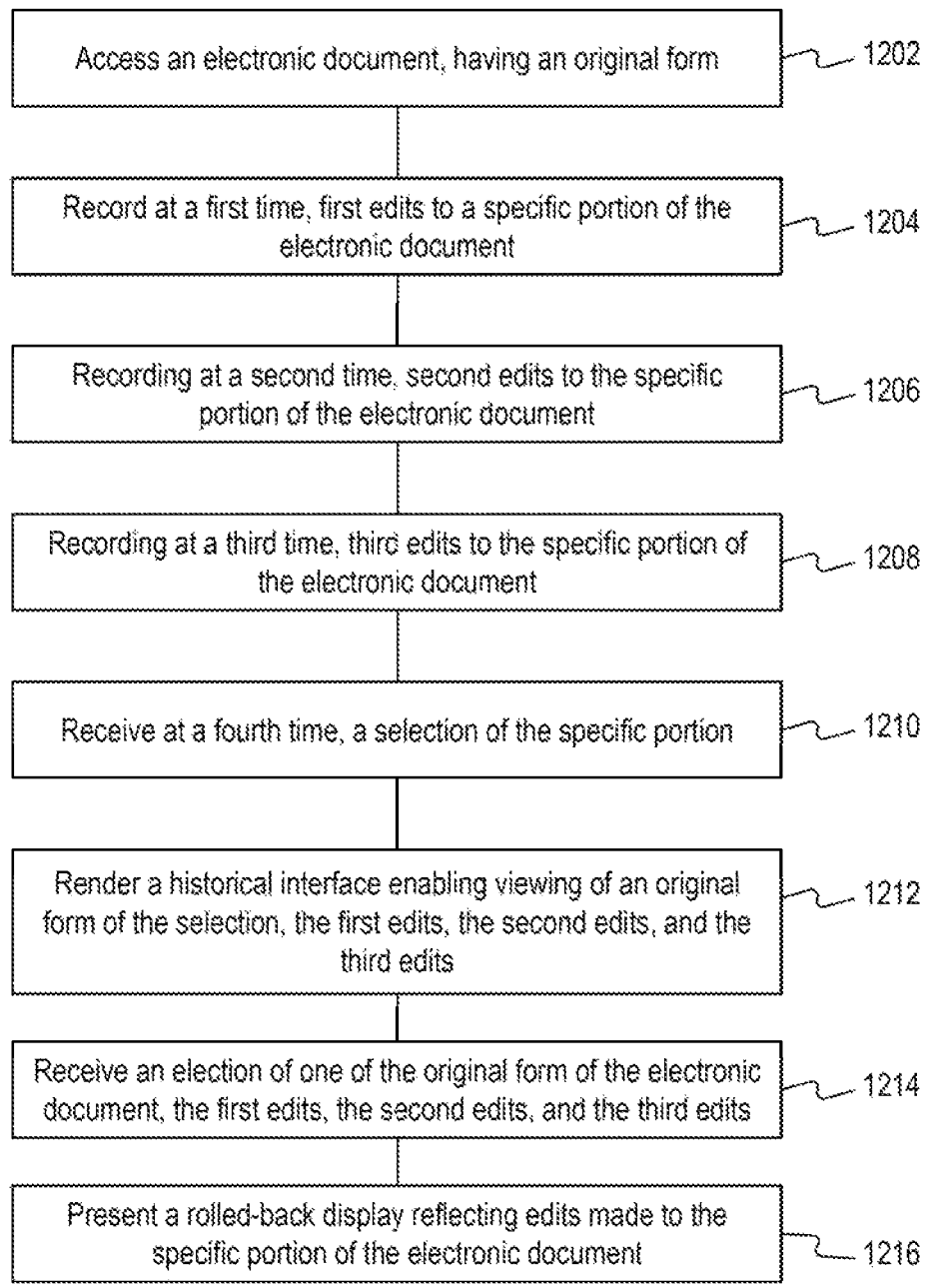
FIG. 12 illustrates a block diagram of an exemplary process for enabling granular rollback of historical edits in an electronic document, consistent with some embodiments of the present disclosure.

FIG. 12 illustrates a block diagram of an example process 1200 for enabling granular rollback of historical edits in an electronic document. While the block diagram may be described below in connection with certain implementation embodiments presented in other figures, those implementations are provided for illustrative purposes only, and are not intended to serve as a limitation on the block diagram. In some embodiments, the process 1200 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 8 to 11 by way of example. In some embodiments, some aspects of the process 1200 may be implemented as software (e.g., program codes or instructions) that are stored in a memory (e.g., the memory portion 122 in FIG. 1) or a non-transitory computer-readable medium. In some embodiments, some aspects of the process 1200 may be implemented as hardware (e.g., a specific-purpose circuit). In some embodiments, the process 1200 may be implemented as a combination of software and hardware.

FIG. 12 may include process blocks 1202 to 1218;

At block 1202, the processing means may be configured to access an electronic document, having an original form, consistent with the earlier disclosure.

At block 1204, the processing means may be configured to record at a first time, first edits to a specific portion of the electronic document, as discussed previously in the disclosure above.

At block 1206, the processing means may involve recording at a second time, second edits to the specific portion of the electronic document, as discussed previously in the disclosure above.

At block 1208, the processing means may involve recording at a third time, third edits to the specific portion of the electronic document, as discussed previously in the disclosure above.

At block 1210, the processing means may be configured to receive at a fourth time, a selection of the specific portion, as discussed previously in the disclosure above.

At block 1212, the processing means may be configured to render a historical interface enabling viewing of an original form of the selection, the first edits, the second edits, and the third edits, as discussed previously in the disclosure above.

At block 1214, the processing means may be configured to receive an election of one of the original form of the electronic document, the first edits, the second edits, and the third edits, as discussed previously in the disclosure above.

At block 1216 the processing means may be further configured to present a rolled-back display reflecting edits made to the specific portion of the electronic document, consistent with the earlier disclosure.

Various embodiments of this disclosure describe unconventional systems, methods, and computer-readable media for tracking on a slide-by-slide basis, edits to presentation slides. In a stored deck of presentation slides, it may be difficult to only undo changes made to a particular slide without also undoing changes made to an entire deck of slides. Further, it may include difficult to view a history of changes made to a particular slide. It may be beneficial to allow viewing of historical changes made to a particular slide. It may be beneficial to enable choosing which, if any, previous changes should be reincorporated. It may be beneficial to enable editing of only particular slide of a deck. By tracking on a slide-by-slide basis, edits to presentation slides, it may increase the efficiency of users editing stored decks of presentation slides by reducing the number of files that need to be stored in memory for version control, which thereby also increases the overall system's processing speed of processing historical edits for a stored slide deck.

Some disclosed embodiments may involve systems, methods, and computer-readable media for tracking on a slide-by-slide basis, edits to presentation slides. Tracking may include following, recording, maintaining, saving, or otherwise storing data and information. For example, data and information associated with an electronic file may be tracked by storing associated data in memory or a repository. Presentation slides may include any program, digital document, or other electronic document used to store and display data or information. Presentation slides may include any presentable data and information as a single page of an electronic document, or multiple pages associated with each other in a deck. For example, a presentation slide may include one or more of text, programming language, video, audio, image, design, document, spreadsheet, tabular, virtual machine, a link or shortcut. The presentation slide may be stored in any manner such as in an image file, a video file, a video game file, an audio file, a playlist file, an audio editing file, a drawing file, a graphic file, a presentation file, a spreadsheet file, a project management file, a pdf file, a page description file, a compressed file, a computer-aided design file, a database, a publishing file, a font file, a financial file, a library, a web page, a personal information manager file, a scientific data file, a security file, a source code file, any other type of file, or other presentable data and information which may be stored in memory or a repository. A slide, as used herein and as discussed above, may include any software, program, or electronic document used to present data or information that may be visually displayed in a single page. A slide may include any subset, portion, page, document, sheet, or specific display of a stored deck of presentation slides. Edits may include any addition, deletion, rearrangement, modification, correction, or other change made to the data or information of a slide. Tracking on a slide-by-slide basis, edits made to presentation slides may include storing or recording alterations made to slides of a stored deck of presentation slides such that alterations made to the slides may be stored in and retrieved from memory or repository individually for each slide. For example, edits made to slides may include metadata that associates the edits with a specific slide and allows a processor to identify the edits as associated with the slide. In a deck of multiple slides, the repository may store alterations to each of the slides individually in different locations in the repository such that when the processor retrieves the data associated with a particular slide, the processor only needs to access the repository once to retrieve all of the data associated with a particular slide. Tracking on a slide-by-slide basis, edits made to presentation slides may involve, for example, storing the addition of a new sentence to the slide in a repository.

Some disclosed embodiments may include presenting a first window defining a slide pane for displaying a slide subject to editing. The relational terms herein such as "first," "second," and "third" are used only to differentiate a window or operation from another window or operation, and do not require or imply any actual relationship or sequence between these windows or operations. Presenting a window may include causing a display of the data or information contained in a dedicated portion of a display in a rendered visualization via a display device, discussed in further detail below. For example, presenting a window may include outputting one or more signals configured to result in the display of a window on a screen, or other surface, through projection, or in virtual space. For example, presenting a window may include visually representing or rendering, on a user device, the data and information associated with a slide in a window. This may occur, for example, on one or more of a touchscreen, a monitor, AR or VR display, or any other means previously discussed and discussed further below. The window may be presented, for example, via a display screen associated with the entity's computing device, such as a PC, laptop, tablet, projector, cell phone, or personal wearable device. The window may also be presented virtually through AR or VR glasses, or through a holographic display. Other mechanisms of displaying may also be used to enable an entity to visually comprehend the presented information.

A window may include any defined area of a rendered display of information dedicated to present information or data. For example, a window may be associated with a width, height, aspect ratio, position indicator, and/or any other information delineating the window's size or position within an electronic file (e.g., represented in metadata associated with the window). In some embodiments, a window may be positioned and/or sized according to one or more inputs initiated by a user (e.g., dragging an outline of the window using a mouse). A slide pane may include any separate, defined, distinct, individual, or other area of a rendered display used for displaying, viewing, modifying, editing, or otherwise receiving input or interaction with one or more slides. A slide pane may refer to a window as described above. A slide subject to editing may be any slide that is actively presented for alteration that allows a user (e.g., by user inputs) to add, delete, rearrange, modify, correct, or otherwise change the data and information in a particular slide. For example, a user may change the text of a slide in a slide subject to editing and may indicate to a processor a particular slide for editing by selecting the particular slide to appear in a slide pane. A first window defining a slide pane for displaying a slide subject to editing may refer to a window rendering information associated with a slide, where the window may be an active editing display that enables editing of that particular slide.

For example, a first window may display a slide on a computing device, such as computing device 100 (of FIG. 1) and may provide a user the ability to make edits to the slide in the presented first window. The first window may display a primary editing window for presentation slides. For example, in FIG. 13A, the first window 1302A may define a slide pane for displaying a slide subject to editing. In this example, the first window 1302A may allow a user to edit "Slide 1" since it appears in the first window 1302A acting as a window pane for actively altering a particular slide appearing in the first window 1302A.

Some disclosed embodiments may include presenting in a second window a current graphical slide sequence pane, for graphically displaying a current sequence of slides in the deck. A current graphical slide may include any visual representation of an existing, recent, or present version of a slide. A current graphical slide sequence pane may refer to a window presenting, via a display device, one or more visual representations of information that may be presented in a succession, series, chain, progression, arrangement, or other order according to a deck of slides that may be selected for presentation. Graphically displaying may include rendering any visual representation, aid, demonstration, showing, or other presentation of data or information in a visual manner. Graphically displaying a current sequence of slides in a deck may include presenting the most recent, existing, latest, or present order of slides in a deck. For example, slides in a deck may be numbered one to four (e.g., it is the intent of a user for the slides to present one after another in order) and may be presented with a preview of this sequence in a dedicated window of a screen. A deck may include any series, set, or group of one or more slides of a presentation or any other electronic document. Presenting in a second window a current graphical slide sequence pane may include displaying a particular deck of slides opened for presentation in the latest order of slides determined by the deck on a display device. The second window may graphically display the current sequence of slides in the deck in any arrangement or order. For example, a slide deck may contain three slides numbered one, two, and three, and the second window may arrange and display the first slide to the left of the second slide which itself may appear to the left of the third slide. Alternatively, in the second window, the first slide may be above the second slide, and the second slide may be above the third slide.

Figure 13A:
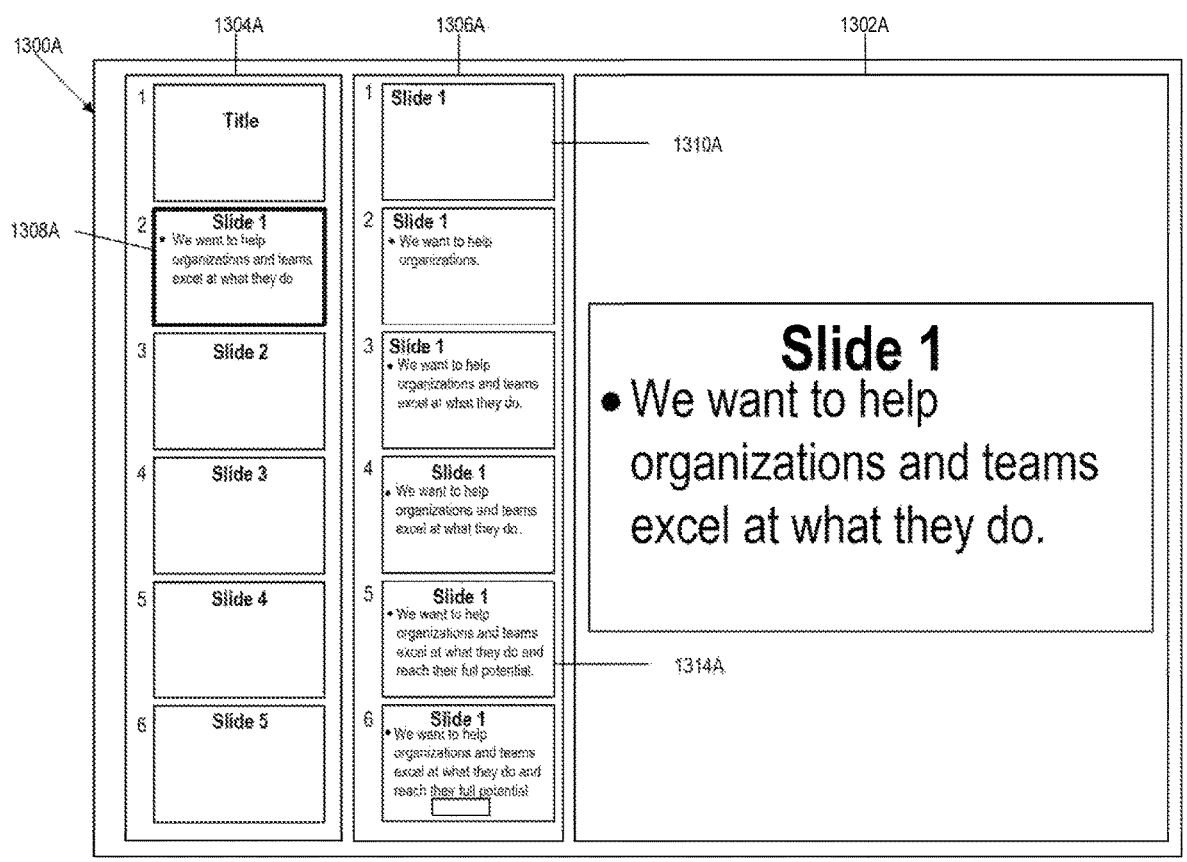
FIG. 13A illustrates an example of a first instance of a stored deck of presentation slides, consistent with some embodiments of the present disclosure.

For example, in FIG. 13A, a second window 1304A may render a visualization of a current graphical slide sequence pane for presenting a visual representation of the current order of the slides in a deck (e.g., Title, Slide 1, Slide 2, Slide 3, Slide 4, Slide 5).

Some disclosed embodiments may include presenting in a third window a historical graphical slide sequence pane for graphically presenting a former sequence of slides in the deck. A historical graphical slide may include any of a previous, past, or prior edition, rendering, display, or version of a slide that was previously stored in memory, A historical graphical slide sequence pane may include a window displaying, via a display device, data or information associated with retrieved historically stored versions of a particular slide according to a particular order. For example, former versions of a slide may be displayed, which may require a processor to perform a lookup of the former versions of a slide in storage or a repository, and then the system may implement and display the former version in a historical graphical slide sequence pane (i.e., the third window). Each previous version of a slide may, for example, include metadata associated with the version allowing the at least one processor to identify the version and distinguish it from other previous versions and the current version of the slide. Historical versions of a particular slide may be saved and/or stored manually or automatically in a repository or other storage medium. For example, a historical version of a slide may be saved in a repository in response to a user input (e.g., the selection of a button) that stores information or instructions in a repository or other storage medium that, when executed by at least one processor, may identify the historical version as associated with the particular slide. Additionally or alternatively, for example, the system may be configured to automatically store, in a repository or other storage medium, the data and information associated with the historical version after a certain amount of time. Graphically presenting may include any visual rendering, representation, aid, demonstration, showing, or other display of data or information. A former sequence may include any order and arrangement of the previous versions of a slide. For example, the slides may be presented in an order based on the time edits were made to the slide. For example, the earliest version of a slide, with edits made at an earliest time, may appear on top of each subsequent previous version of the slide. Alternatively, the most recent historical graphical slide may appear on top and the earliest historical graphical slide may be on the bottom. Graphically presenting a former sequence of slides in the deck may include displaying previous, past, historical, or prior editions, displays, instances, or other versions of a particular slide or for multiple slides. For example, presenting in a third window a historical graphical slide sequence pane for graphically presenting a former sequence of slides in the deck may include displaying historical versions of a slide in the chronological order in which edits were made to the slide. For example, the third window may display three prior versions of a slide, each version visually representing the slide at different previous times. The processor may be configured to store different versions of the slides in a repository or other storage medium and may include metadata so a processor may identify each version of a slide and display each previous version in an any order. For example, graphically presenting a former sequence of slides in the deck may include associating each slide with a different timestamp, and the processor may, in one lookup, retrieve all the data associated with a particular slide (each historical graphical slide) from a repository and display the historical graphical slides in chronological order, based on the timestamp.

For example, in FIG. 13A, a third window 1306A may include a rendering of a historical graphical slide sequence pane and may present previous versions of a particular slide (e.g., Slide 1). As shown, the previous versions of the slide (e.g., Slide 1) may be ordered to represent different versions of the slide. For example, slide 1310A may represent a first version of a particular slide, and 1314A may represent a later version of the particular slide (e.g., edits made after the edits made to the first version) in a chronological manner.

Some disclosed embodiments may include accessing a stored deck of presentation slides. Accessing may include gaining authorization or entry to download, upload, copy, extract, update, edit, or otherwise receive, retrieve, or manipulate data or information through an electrical medium. For example, for a client device (e.g., a computer, laptop, smartphone, tablet. VR headset, smart watch, or any other electronic display device capable of receiving and sending data) to access a stored deck, it may require authentication or credential information, and the processor may confirm or deny authentication information supplied by the client device as needed. Accessing a stored deck may include retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provide a medium for exchanging data, from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the stored deck may include retrieving the deck from a web browser cache. Additionally or alternatively, accessing the stored deck may include accessing a live data stream of the stored deck from a remote source. In some embodiments, accessing the stored deck may include logging into an account having a permission to access the deck. For example, accessing the stored deck may be achieved by interacting with an indication associated with the stored deck, such as an icon or file name, which may cause the system to retrieve (e.g., from a storage medium) a particular electronic document associated with the indication. A stored deck of presentation slides, as discussed previously above, may include any software, program, digital document, or other electronic document used to display or present data or information on one or more displayed pages in at least one deck that may be stored in a repository.

For example, a deck may be stored in repository 230-1 as shown in FIG. 2. Repository 230-1 may be configured to store software, files, or code, such as presentation slides developed using computing device 100 or user device 220-1. Repository 230-1 may further be accessed by computing device 100, user device 220-1, or other components of system 200 for downloading, receiving, processing, editing, or viewing, the presentation slides. Repository 230-1 may be any suitable combination of data storage devices, which may optionally include any type or combination of slave databases, load balancers, dummy servers, firewalls, back-up databases, and/or any other desired database components. In some embodiments, repository 230-1 may be employed as a cloud service, such as a Software as a Service (SaaS) system, a Platform as a Service (PaaS), or Infrastructure as a Service (IaaS) system. For example, repository 230-1 may be based on infrastructure of services of Amazon Web Services™ (AWS), Microsoft Azure™, Google Cloud Platform™, Cisco Metapod™, Joyent™, vmWare™, or other cloud computing providers. Repository 230-1 may include other commercial file sharing services, such as Dropbox™, Google Docs™, or iCloud™. In some embodiments, repository 230-1 may be a remote storage location, such as a network drive or server in communication with network 210. In other embodiments repository 230-1 may also be a local storage device, such as local memory of one or more computing devices (e.g., computing device 100) in a distributed computing environment.

Some disclosed embodiments may include populating a first window, a second window, and a third window with slides of a deck. Populating a window may include receiving instructions for retrieving data from a repository to present the data in a rendered display of a window on a screen, where the window may display information corresponding to the retrieved data. For example, populating a window may require a processor to perform a lookup in a repository for the data and information that will fill the rendered window on a screen. Populating a window with slides in a deck may include filling a window (e.g., the first window, the second window, and the third window) with retrieved data associated with a deck of slides and render the corresponding information associated with the deck in the window. For example, a slide deck may be stored in memory or a repository, and a processor may be configured to retrieve the information and display the information retrieved in the first window, the second window, and/or the third window.

Some disclosed embodiments may include receiving a selection of a particular slide having a current version displayed in the second window and a former version displayed in the third window. Receiving a selection may include the system accepting a user input from a computing device associated with a user that indicates instructions to make an election or selection. The user input may be transmitted over a network to a repository where the stored deck of presentation slides may be stored. A selection may include any action taken to elect, pick, designate, or otherwise choose a particular slide. A selection may involve an input from a user input device (e.g., a mouse, a keyboard, touchpad, VR/AR device, or any other electrical or electromechanical device from which signals may be provided) or non-user input (e.g., a sensor reading, an event listener detection, or other automatic computerized sensing of changed circumstances). For example, a selection may be a mouse click, a mouseover, a highlight, a hover, a touch on a touch sensitive surface, a keystroke, a movement in a virtual interface, or any other action indicating a choice of a particular slide. For example, a selection may be using a mouse to click a particular slide. Additionally or alternatively, a selection may require an additional click of an activatable element, such as a button. A particular slide may refer to any single, specific, unique, or distinct slide. For example, a particular slide may be one slide selected from a slide deck. A current version of a slide may include any existing, recent, or present form of a particular slide in a deck. For example, the current version of a slide may be the most recent form of the slide that was saved to a repository. Additionally or alternatively, the current version of a slide may be the most recent form of the slide that is open and displayed on a user device. A current version displayed in the second window may include presenting the current version of a particular slide in a rendered second window. For example, the system may output one or more signals configured to result in the data and information associated with the current version to display in the second window on a screen of a user device. A former version of a slide may include any previous, earlier, past, historical, prior, or other form of the slide at a time before the present time. For example, a prior version of the slide may be recorded, saved, and/or stored in a repository with metadata associating it as a former version of the particular slide. A former version displayed in the third window may include presenting the former version of the slide in the third window. For example a processor may retrieve from a repository the former version of the particular slide and present it in the third window.

Some disclosed embodiments may include receiving a first selection of a particular slide in a second window, and upon receipt of the first selection, cause a rendition of the particular slide to appear in a first window. Further, at least one processor may be configured to receive a second selection of the particular slide in a third window; and upon receipt of the second selection, cause a rendition of the particular slide to appear in the first window. Receiving a selection, as discussed previously above, may include the system accepting a user input from a computing device associated with a user that indicates instructions to make a selection. Receiving a first selection of a particular slide in a second window may include, for example, a user input (e.g., a mouse click) indicating an election of a particular slide rendered visually in the second window. A user may select any slide in the second window. For example, a user may select any slide in a sequence of slides in a deck, such as the first slide in a deck, and/or the last slide in a deck. Receiving a second selection of a particular slide in the third window may include a user input indicating an election of a slide rendered visually in the third window. A user may select any slide in the third window. For example, a user may select any of the historical versions of the particular slide appearing in the third window. Causing a rendition of a particular slide may include outputting a signal resulting in a display of data and information associated with the particular slide in a window on a display device. For example, at least one processor may perform a lookup of the particular slide in a repository, retrieve the data associated with the particular slide, and output signals to cause the data of the particular slide to be visually displayed in a window with information associated with the particular slide. Causing a rendition of a particular slide to appear in the first window may include showing, presenting, outputting, rendering, mirroring, or otherwise displaying the selected particular slide in the first window. For example, a user may select a slide in the second window, and the system may be configured to display the selected slide in the first window.

Figure 13B:
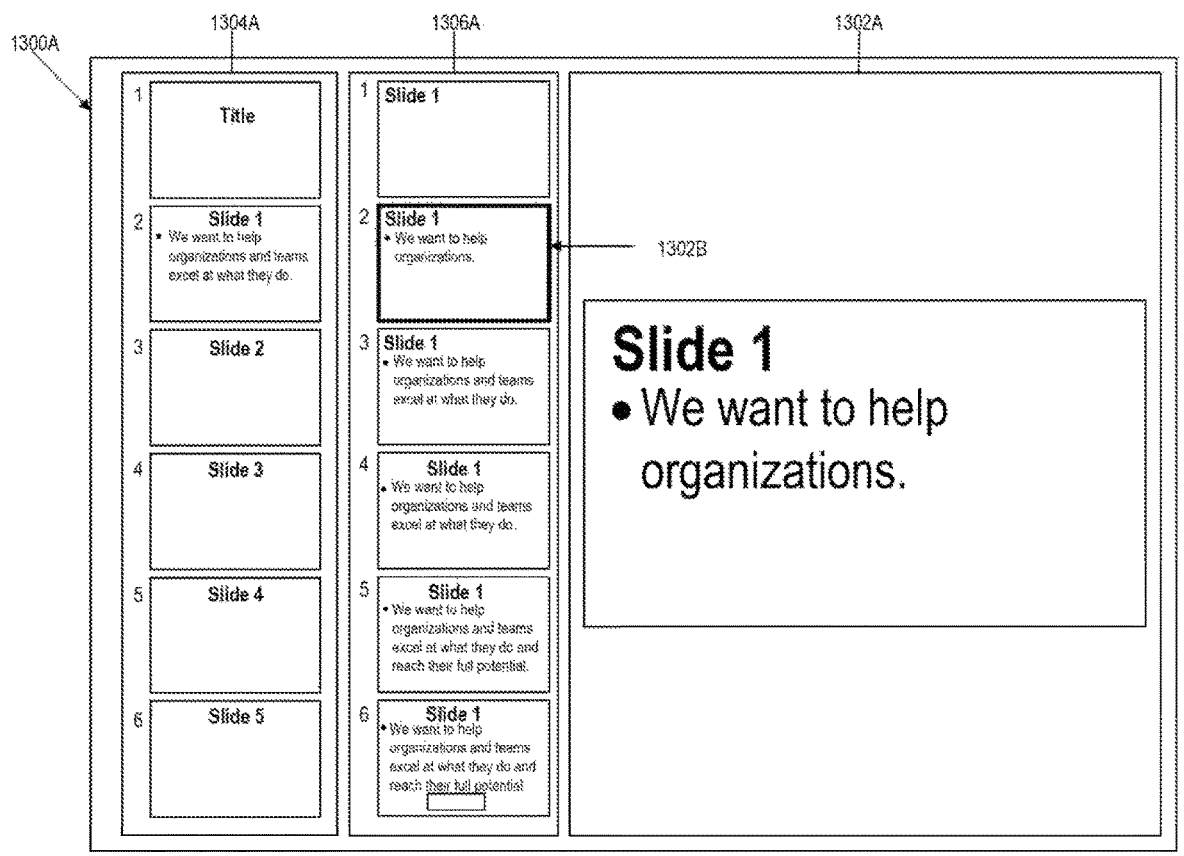
FIG. 13B illustrates an example of a second instance of a stored deck of presentation slides, consistent with some embodiments of the present disclosure.
Figure 13C:
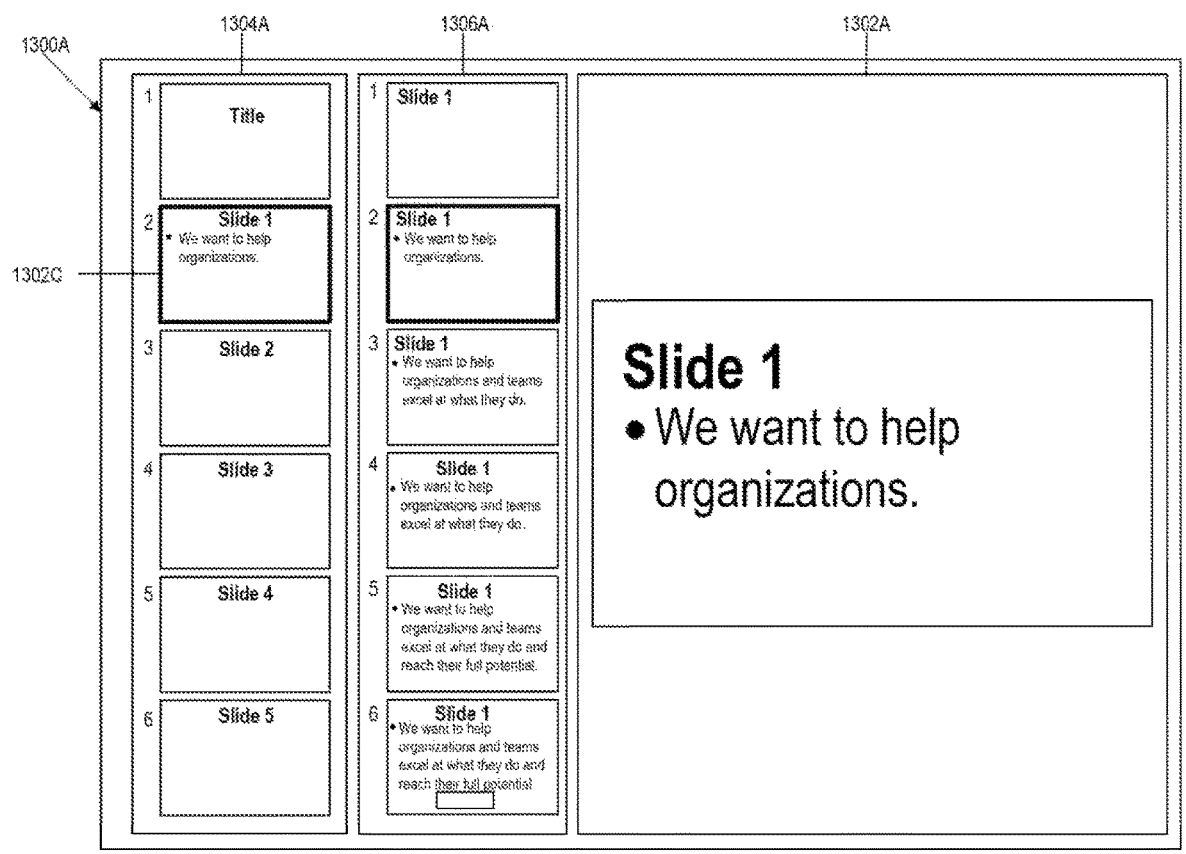
FIG. 13C illustrates an example of a third instance of a stored deck of presentation slides, consistent with some embodiments of the present disclosure.

For example, FIG. 13A to FIG. 13C may represent a stored deck of presentation slides presented on a display device. In FIG. 13A, a user may select (e.g., via a mouse click or any other interaction) a particular slide 1308A from the second window 1304A (e.g., the current graphical slide sequence), which may cause the particular slide 1308A to appear in the first window 1302A, Next, as shown in FIG. 13B, a user may select a particular slide 1302B in the third window 1306A (e.g., a historical graphical slide sequence), which may cause the particular slide 1302B to appear in the first window 1302A.

Some disclosed embodiments may include receiving a drag of a particular slide from the third window into the second window, to thereby reincorporate an earlier version of the particular slide from the former version into the current sequence of slides in the second window, where the at least on processor may be further configured to store in a timeline repository, a first record of the drag. Receiving a drag may include the system accepting a user input from a computing device associated with a user that indicates instructions to make an election of a data object in a rendered display and reposition the visual representation of the data object to a different location in the rendered display. The user input may be transmitted over a network to a repository where the stored deck of presentation slides may be stored. A drag may refer to an election of a visual representation of a data object (e.g., clicking on a particular slide) and repositioning the visual representation of the data object to a different location in a screen. For example, a drag may include pressing a mouse button down and moving the mouse while holding the button to send instructions to the processor to reposition a data object in a rendered display of information. Alternatively, a drag may refer to a mouse click in a first location on a display device and a second mouse click in a second location on the display device to indicate an intent to cause a drag of a data object. For example, a drag may involve electing a particular slide rendered in a third window and repositioning the particular slide to a second window. Dragging a particular slide between different windows may include a seamless visualization of repositioning the particular slide from one window to another, or may involve a re-rendering of the display of information in a particular slide to simply appear in another window. Reincorporating an earlier version of the particular slide from the former version into the current sequence of slides in the second window may include receiving instructions to retrieve information associated with a previously recorded version of a slide and replacing a current version of the slide in memory to adopt the previously recorded version of the slide into the current version of a presentation file. Reincorporating an earlier version may involve outputting one or more signals configured to result in the rendering of the earlier version of the particular slide in the second window. For example, the earlier version may replace the current version displayed in the second window. Similarly, for example, the earlier version of the particular slide may be stored with a current sequence of slides in the deck so a former version of the particular slide may appear in the current sequence of slides in the deck, and the replaced version may then be stored in a repository as a historical version of the slide (e.g., the replaced version may become a new "earlier" version of the slide sequence after it is replaced). A timeline repository may include any memory, repository, or other storage medium that may contain data or information and or commands, operations, or instructions capable of being carried out by at least one processor. For example, historical versions of a slide may be stored in a timeline repository. Storing in a timeline repository, a record of the drag may include saving, recording, keeping, maintaining, or preserving the first record of the drag in memory or repository (e.g., data structure). For example, the timeline repository may record each drag so each historical version of a particular slide may be retrieved and rendered to appear in the third window in chronological order according to a timestamp that may be stored with each record of each drag.

Upon dragging, some disclosed embodiments may include moving an associated slide from a second window to a third window and storing in a timeline repository a second record of the moving. An associated slide from a second window may include any slide in the second window that is moved, rearranged, modified, corrected, replaced, or otherwise changed due to the dragging. Moving an associated slide from a second window to a third window may include causing the rendition of the associated slide in the third window, as discussed previously above. For example, a slide in the second window may be replaced by the dragging of a historical version of the slide from the third window, and the system may be configured to cause the associated replaced slide to appear in the third window. As a result of moving the associated slide from the second window to the third window (e.g., a drag) the processor may, in response to detecting the moving, store in the timeline repository a second record of the moving.

In some disclosed embodiments, at least one processor may be configured to present a slider extending between a second window and a third window, to enable sequential sets of changes to be displayed as the slider is dragged from a location proximate the third window representing an earliest slide version to a location proximate the second window representing a latest slide version. Further disclosed embodiments may include receiving a selection of a slide portion from an earlier version for incorporation into a current version, Presenting a slider extending between the second window and the third window may include causing a display of an interactable element between windows for interacting with displayed information between windows, such as in the form of a slider. A slider may be part of a visual interface that displays multiple previous versions corresponding to a particular slide, where the slide may be an activatable element that enables a user to view the previous versions of the particular slide. For example, the slider extending between the second window and the third window may include causing multiple previous versions of the particular slide to be rendered in a displayed interface. Enabling sequential sets of changes to be displayed may including receiving instructions to retrieve historical alteration data to a particular slide and causing the historical alteration data to be rendered on a screen in a chronological order. Sequential sets of changes may include edits made previously, in the past, prior to, or otherwise made at a time before the present time in an order of when the changes were made in a particular logical order, such as in a chronological manner. For example, changes may be stored in a repository with metadata associated with an instance in time such that the at least one processor may determine the order changes were made to a particular slide and display, via a display device, the changes in an order. A location proximate a window may include any place or position that is near, next to, adjacent, or otherwise close to a window. A window, as discussed above, may represent a particular version of a slide in time, with one window rendering information from an earliest slide version and another window rendering information from a latest slide version. For example, the processor may lookup historical data associated with a particular slide in a repository and cause a display of a progression of changes made over time to the slide based on metadata identifying a timestamp associated with different historical versions of the slide, such as displaying the earliest versions of a slide (e.g., earliest timestamp) near the third window and the most recent changes (e.g., latest timestamp) appearing near the second window. This may allow, for example, a user to identify the edits made to a particular slide over time. A slide portion may include any subset, piece, segment, section, or other part of information displayed in a visually rendered slide. Receiving a selection of a slide portion from an earlier version, as discussed above, may include choosing, picking, or otherwise selecting a portion of a slide from an earlier version and incorporating it into a current version. For incorporation into a current version may refer to accessing the current version data and replacing it with data from an earlier version of the particular slide. The data associated with the replaced version may be stored in the repository associated with the particular slide as a historical version of the particular slide. For example, a user may select a part of a historical version of the particular slide (e.g., a single sentence in a paragraph), and instead of reincorporating the entire slide, as discussed above, the system may be configured to reincorporate the part of the historical version chosen (e.g., the single sentence in the paragraph). For example, the title of a particular slide may change over time, and the information presented on the slide may also change. The system may allow a user to keep the information presented on the current slide but reincorporate the previous title. For example, a historical version of a particular slide may be stored in a repository and the data associated with the title may be different from the title of the current slide. In response to a user selection of the title from the historical version, the system may access the data associated with the title of the current version and replace it with the title of the historical version. The version of the slide with the replaced title (e.g., the current version before the user selection) may then be stored in a repository as a new historical version of the particular slide.

Some disclosed embodiments may include displaying a timeline slider in association with a particular slide, the timeline slider enabling viewing of a sequence of changes that occurred over time to the particular slide, and where at least one processor may additionally be configured to receive an input via the timeline slider to cause a display of an editing rollback of the particular slide. Displaying a timeline slider may include rendering an interactive display of an interface that may present historical information associated with a particular slide in a sequential order (e.g., chronological). For example, historical versions of a particular slide may be displayed which may require the at least one processor to perform a lookup of the historical versions of a particular slide in storage or a repository, and then implement and present the historical versions with the time slider. Each historical version of a particular slide may include metadata associated with the version allowing the at least one processor to identify the version and distinguish it from other versions of the particular slide. A timeline slider in association with a particular slide may include one or more interactable visual elements, such as a slider with markers, enabling a user to change between displays of different previous versions of the particular slide. For example, a user may click a marker on the timeline slider and the marker may allow the user to view a version of the particular slide associated with that marker. A user may then click a different marker on the timeline slider which may cause the display of a different version of the particular slide. Enabling viewing of a sequence of changes that occurred over time to the particular slide may include causing a display of historical information associated with a particular slide such that an authorized user may view and interact with the historical alterations made to the particular slide in a timeframe. For example, the timeline slider may be presented to enable a user to view previous versions or forms of a particular slide and interact with these previous versions of the particular slide for incorporating into an electronic file. Receiving an input may include detecting an instruction from an associated computing device of a user or account that indicates an intent for choosing, picking, deciding, appointing, or otherwise selecting (e.g., by a mouse click, gesture, cursor movement, or any other action by a user) a specific action, such as selecting data in memory to adopt into a current version of an electronic document. For example, receiving an input may be a data input from a computer device. Receiving an input may include any signal or indication that meets a threshold for carrying out instructions for presenting an editing rollback display, such as performing a look up of data or information stored in a repository associated with the particular slide. Causing a display of an editing rollback of the particular slide may include rendering a presentation of a historical version of a particular slide in response to receiving an input by a user to view historical information associated with the particular slide. An editing rollback of a particular slide may include a displayed preview of a previous version of the particular slide in a manner that returns a current display of the particular slide to the previous version. For example, the system may receive an input via the timeline slider, such as selecting a version of the particular slide, and in response to the selection, the system may perform a lookup of the data and information stored in a repository associated with the selected version. As a result of the lookup, the processor may retrieve historical data and present it in a display as an editing rollback for that particular slide in a manner enabling a user to interact with the historical data for further manipulation or adoption.

Figure 14:
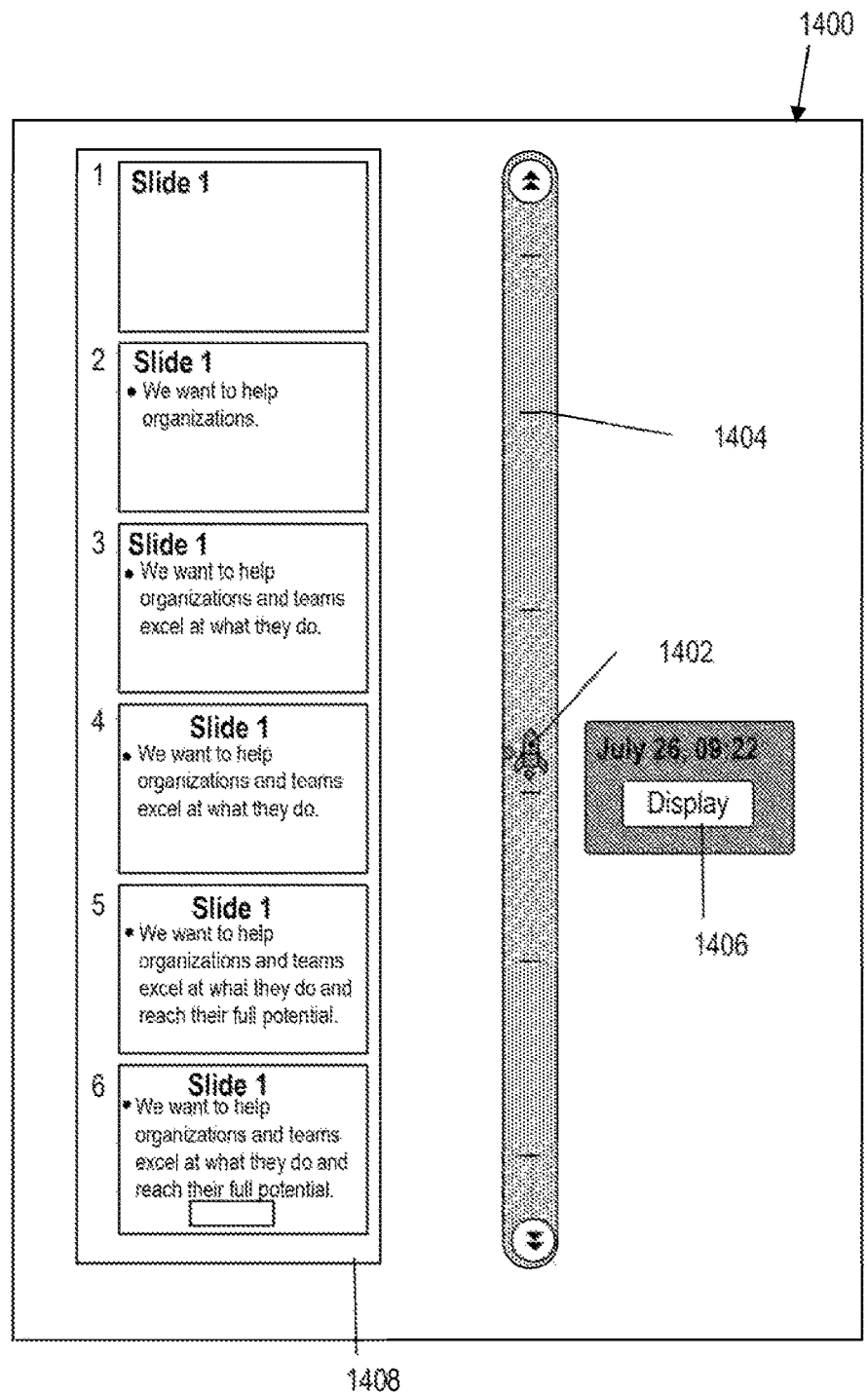
FIG. 14 illustrates an example of a timeline slider, consistent with some embodiments of the present disclosure.

For example, FIG. 14 illustrates a timeline slider 1400. A user may interact with the timeline slider 1400 by, for example, dragging a visual icon 1402 (e.g., the rocket ship) or by clicking on a marker 1404. Changing between different markers may allow a user to view a sequence of changes made over time to a particular slide. A user may also interact with the timeline slider 1400 to provide an input to the processor by interacting with an interactable element 1406 that may send instructions to cause a display of editing rollback of the particular slide in a rendered display 1408.

During a display of an editing rollback, some disclosed embodiments may include a display characteristic that differs from a display characteristic that occurs during a current slide display. A display characteristic may include any visual feature, trait, element, interface, attribute, or other quality of slide. A display characteristic different from a display characteristic that occurs during a current slide display may include any display characteristic that is unique, distinct, changed, individual, or otherwise not the same as the display characteristic of the current slide display. For example, a historical version of a particular slide may not have any graphical images or pictures associated with the slide, while the current slide display may contain pictures. In another example, a historical version of a particular slide may have a display characteristic where the text is displayed with a red color while a display characteristic of the current version of the particular slide may be displayed with a black color.

Figure 15:
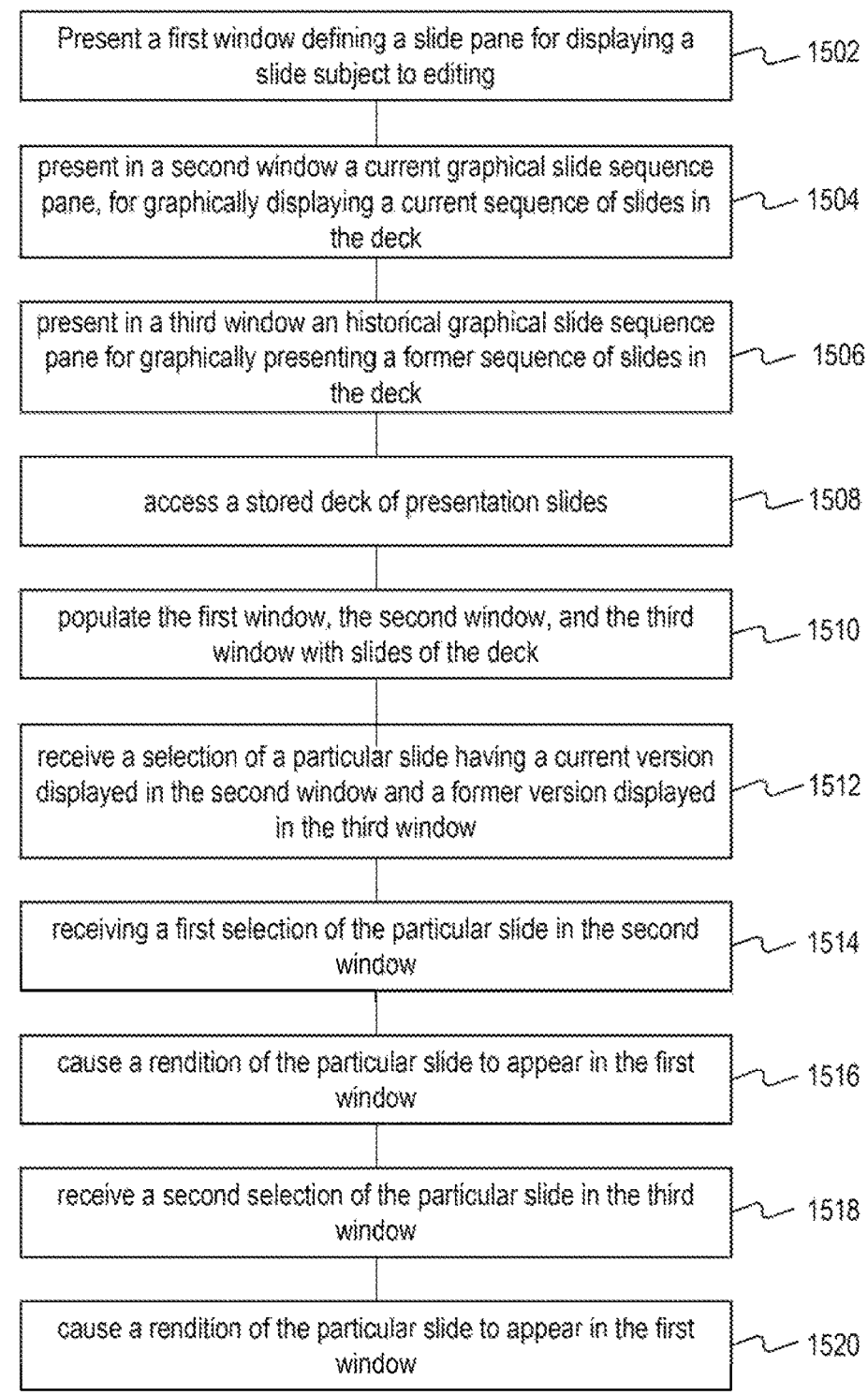
FIG. 15 illustrates a block diagram of an exemplary process for tracking on a slide-by-slide basis, edits to presentation slides, consistent with some embodiments of the present disclosure.

FIG. 15 illustrates a block diagram of an example process 1500 for tracking on a slide-by-slide basis, edits to presentation slides. While the block diagram may be described below in connection with certain implementation embodiments presented in other figures, those implementations are provided for illustrative purposes only, and are not intended to serve as a limitation on the block diagram. In some embodiments, the process 1500 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 13 to 14 by way of example. In some embodiments, some aspects of the process 1500 may be implemented as software (e.g., program codes or instructions) that are stored in a memory (e.g., the memory portion 122 in FIG. 1) or a non-transitory computer-readable medium. In some embodiments, some aspects of the process 1500 may be implemented as hardware (e.g., a specific-purpose circuit). In some embodiments, the process 1500 may be implemented as a combination of software and hardware.

FIG. 15 may include process blocks 1502 to 1520:

At block 1502, the processing means may be configured to present a first window defining a slide pane for displaying a slide subject to editing, consistent with some embodiment discussed above.

At block 1504, the processing means may be configured to present in a second window a current graphical slide sequence pane, for graphically displaying a current sequence of slides in the deck, as discussed previously in the disclosure above.

At block 1506, the processing means may be configured to present in a third window an historical graphical slide sequence pane for graphically presenting a former sequence of slides in the deck, as discussed previously above.

At block 1508, the processing means may be configured to access a stored deck of presentation slides, as discussed previously.

At block 1510, the processing means may be configured to populate the first window, the second window, and the third window with slides of the deck, as discussed previously above.

At block 1512, the processing means may be configured to receive a selection of a particular slide having a current version displayed in the second window and a former version displayed in the third window, as discussed previously above.

At block 1514, the processing means may include receiving a first selection of the particular slide in the second window, as discussed above.

At block 1516 the processing means may be further configured to cause a rendition of the particular slide to appear in the first window, consistent with the earlier disclosure.

At block 1518, the processing means may be further configured receive a second selection of the particular slide in the third window, as discussed previously in the disclosure above.

At block 1520 the processing means may be further configured cause a rendition of the particular slide to appear in the first window, consistent with the earlier disclosure.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer" or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include anyone of the following bullet-pointed features alone or in combination with one or more other bullet-pointed features, whether implemented as a method, by at least one processor, and/or stored as executable instructions on non-transitory computer-readable media:

accessing a collaborative electronic document;
linking a first entity and a second entity to form a first collaborative group;
linking a third entity and a fourth entity to form a second collaborative group;
receiving a first alteration by the first entity to the collaborative electronic document;
tagging the first alteration by the first entity with a first collaborative group indicator;
receiving a second alteration to the collaborative electronic document by the second entity;
tagging the second alteration by the second entity with the first collaborative group indicator;
receiving a third alteration to the collaborative electronic document by the third entity;
tagging the third alteration by the third entity with a second collaborative group indicator,
receiving a fourth alteration from the fourth entity to the collaborative electronic document;
tagging the fourth alteration by the fourth entity with the second collaborative group indicator;
rendering a display of the collaborative electronic document;
wherein the rendered display includes presenting the first collaborative group indicator in association with the first alteration and the second alteration;
wherein the rendered display includes the second collaborative group indicator displayed in association with the third alteration and the fourth alteration;
wherein the first collaborative group includes a plurality of first additional entities linked to the first and second entities;
wherein the second collaborative group includes a plurality of second additional entities linked to the third and fourth entities;
wherein the displayed first collaborative group indicator in association with the first alteration and the second alteration includes a first instance of the first collaborative group indicator displayed in association with the first alteration and a second instance of the first collaborative group indicator displayed in association with the second alteration;
wherein the third alteration and the fourth alteration includes a first instance of the second collaborative group indicator displayed in association with the third alteration and a second instance of the second collaborative group indicator displayed in association with the fourth alteration;
preventing the second collaborative group from making edits to the first alteration and the second alteration;
receiving an attempt by a fifth entity to change the first alteration;
accessing permissions settings;

determining whether the fifth entity possesses a permission enabling change of the first alteration;
upon determination of a change-enabling permission, applying the change to the first alteration;
wherein the determination that the fifth entity possesses the permission is based on a determination that the fifth entity is associated with the first collaborative group;
recognizing the fifth entity as a member of a third collaborative group with permission to change alterations of the first collaborative group
permitting the change to the first alteration;
tagging the change with a third collaborative group indicator;
receiving an attempt by a sixth entity to change the first alteration;
accessing permissions settings;
determining whether that the six entity lacks permission enabling change of the first alteration;
generating a duplicate version of the collaborative electronic document in which the sixth entity is permitted to change the first alteration;
accessing the electronic document, having an original form;
recording at a first time, first edits to a specific portion of the electronic document;
recording at a second time, second edits to the specific portion of the electronic document;
recording at a third time, third edits to the specific portion of the electronic document;
receiving at a fourth time, a selection of the specific portion;
in response to the selection, rendering a historical interface enabling viewing of an original form of the selection, the first edits, the second edits, and the third edits;
receiving an election of one of the original form of the electronic document, the first edits, the second edits, and the third edits;
upon receipt of the election, presenting a rolled-back display reflecting edits made to the specific portion of the electronic document, the rolled-back display corresponding to a past time associated with the election;
wherein the historical interface includes an interactive timeline enabling rollback of edits to markers on the timeline denoting the original form of the selection, the first edits, the second edits, and the third edits;
wherein the first edits were made by a first entity, the second edits were made by a second entity and the third edits were made by a third entity, and wherein the markers enable identification of a particular entity associated with a particular edit;
wherein the markers indicate an identity of an associated entity responsible for an associated edit;
wherein the first edits, the second and the third edits are each associated with a common entity;
applying a time interval to document edits and wherein selection of a particular marker causes presentation of changes that occurred during the time interval;
wherein the time interval is user-definable;
wherein the historical interface is configured to simultaneously display the first edit, the second edit, and the third edit;
co-displaying the timeline in a vicinity of the specific portion of the electronic document;
presenting a first window defining a slide pane for displaying a slide subject to editing;
presenting in a second window a current graphical slide sequence pane, for graphically displaying a current sequence of slides in the deck;
presenting in a third window a historical graphical slide sequence pane for graphically presenting a former sequence of slides in the deck;
accessing a stored deck of presentation slides;
populating the first window, the second window, and the third window with slides of the deck;
receiving a selection of a particular slide having a current version displayed in the second window and a former version displayed in the third window;
receiving a first selection of the particular slide in the second window;
upon receipt of the first selection, causing a rendition of the particular slide to appear in the first window;
receiving a second selection of the particular slide in the third window;
upon receipt of the second selection, causing a rendition of the particular slide to appear in the first window;
receiving a drag of the particular slide from the third window into the second window, to thereby reincorporate an earlier version of the particular slide from the former version into the current sequence of slides in the second window;
storing in a timeline repository, a first record of the drag;
moving an associated slide from the second window to the third window and storing in the timeline repository a second record of the moving;
displaying a timeline slider in association with the particular slide, the timeline slider enabling viewing of a sequence of changes that occurred over time to the particular slide;
receiving an input via the timeline slider to cause a display of an editing rollback of the particular slide;
wherein during display of an editing rollback, a display characteristic differs from a display characteristic that occurs during a current slide display;
presenting a slider extending between the second window and the third window, to enable sequential sets of changes to be displayed as the slider is dragged from a location proximate the third window representing an earliest slide version to a location proximate the second window representing a latest slide version; and
receiving a selection of a slide portion from an earlier version for incorporation into a current version.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for tracking on a slide-by-slide basis, edits to presentation slides, the system comprising:
    at least one processor configured to:
        present a first window defining a slide pane for displaying a slide subject to editing;
        present in a second window a current graphical slide sequence pane, for graphically displaying a current sequence of slides in the deck;
        present in a third window a historical graphical slide sequence pane for graphically presenting a former sequence of slides in the deck;
        access a stored deck of presentation slides;
        populate the first window, the second window, and the third window with slides of the stored deck;
        receive a selection of a particular slide having a current version displayed in the second window and a former version displayed in the third window;
        receive a first selection of the particular slide in the second window;
        upon receipt of the first selection, cause a rendition of the particular slide having the current version to appear in the first window;
        receive a second selection of the particular slide in the third window; upon receipt of the second selection, cause a rendition of the particular slide having the former version to appear in the first window;
        receive a drag of the particular slide from the third window into the second window, to thereby reincorporate an earlier version of the particular slide from the former version into the current sequence of slides in the second window, and store in a timeline repository, a first record of the drag; and
        in response to the drag, move an associated slide from the second window to the third window and storing in the timeline repository a second record of the moving.

2. The system of claim 1, wherein the at least one processor is further configured to display a timeline slider in association with the particular slide, the timeline slider enabling viewing of a sequence of changes that occurred over time to the particular slide, and wherein the at least one processor is further configured to receive an input via the timeline slider to cause a display of an editing rollback of the particular slide.

3. The system of claim 2, wherein during display of an editing rollback, a display characteristic differs from a display characteristic that occurs during a current slide display.

4. The system of claim 1, wherein the at least one processor is further configured to present a slider extending between the second window and the third window, to enable sequential sets of changes to be displayed as the slider is dragged from a location proximate the third window representing an earliest slide version to a location proximate the second window representing a latest slide version.

5. The system of claim 4, wherein the at least one processor is further configured to receive a selection of a slide portion from an earlier version for incorporation into a current version.

6. A non-transitory computer readable medium including instructions that, when executed by at least one processor, cause the at least one processor to perform operations for tracking on a slide-by-slide basis, edits to presentation slides, the operations comprising:
- presenting a first window defining a slide pane for displaying a slide subject to editing;
- presenting in a second window a current graphical slide sequence pane, for graphically displaying a current sequence of slides in the deck;
- presenting in a third window an historical graphical slide sequence pane for graphically presenting a former sequence of slides in the deck;
- accessing a stored deck of presentation slides;
- populating the first window, the second window, and the third window with slides of the stored deck;
- receiving a selection of a particular slide having a current version displayed in the second window and a former version displayed in the third window;
- receiving a first selection of the particular slide in the second window;
- upon receipt of the first selection, causing a rendition of the particular slide having the current version to appear in the first window;
- receiving a second selection of the particular slide in the third window; upon receipt of the second selection, causing a rendition of the particular slide having the former version to appear in the first window;
- receiving a drag of the particular slide from the third window into the second window, to thereby reincorporate an earlier version of the particular slide from the former version into the current sequence of slides in the second window, and storing in a timeline repository, a first record of the drag; and
- in response to the drag, moving an associated slide from the second window to the third window and storing in the timeline repository a second record of the moving.

7. The non-transitory computer readable medium of claim 6, wherein the operations further include displaying a timeline slider in association with the particular slide, the timeline slider enabling viewing of a sequence of changes that occurred over time to the particular slide, and wherein the operations additionally include receiving an input via the timeline slider to cause a display of an editing rollback of the particular slide.

8. The non-transitory computer readable medium of claim 7, wherein during display of an editing rollback, a display characteristic differs from a display characteristic that occurs during a current slide display.

9. The non-transitory computer readable medium of claim 6, wherein the operations further comprise presenting a slider extending between the second window and the third window, to enable sequential sets of changes to be displayed as the slider is dragged from a location proximate the third window representing an earliest slide version to a location proximate the second window representing a latest slide version.

10. The non-transitory computer readable medium of claim 9, wherein the operations further include receiving a selection of a slide portion from an earlier version for incorporation into a current version.

* * * * *